(12) United States Patent
Spruce et al.

(10) Patent No.: US 10,928,816 B2
(45) Date of Patent: *Feb. 23, 2021

(54) METHODS AND SYSTEMS FOR GENERATING WIND TURBINE CONTROL SCHEDULES

(71) Applicant: VESTAS WIND SYSTEMS A/S, Aarhus N (DK)

(72) Inventors: Chris Spruce, Leatherhead (GB); Chakradhar Byreddy, Spring, TX (US)

(73) Assignee: VESTAS WIND SYSTEMS A/S, Aarhus N (DK)

(*) Notice: Subject to any disclaimer, the term of this patent is extended or adjusted under 35 U.S.C. 154(b) by 529 days.

This patent is subject to a terminal disclaimer.

(21) Appl. No.: 15/738,208

(22) PCT Filed: Jun. 21, 2016

(86) PCT No.: PCT/DK2016/050204
§ 371 (c)(1),
(2) Date: Dec. 20, 2017

(87) PCT Pub. No.: WO2017/000951
PCT Pub. Date: Jan. 5, 2017

(65) Prior Publication Data
US 2018/0173215 A1    Jun. 21, 2018

Related U.S. Application Data

(60) Provisional application No. 62/186,845, filed on Jun. 30, 2015.

(30) Foreign Application Priority Data

Aug. 21, 2015 (DK) .............................. 2015 705041

(51) Int. Cl.
G05B 23/02 (2006.01)
F03D 7/04 (2006.01)
(Continued)

(52) U.S. Cl.
CPC ....... *G05B 23/0283* (2013.01); *F03D 7/0292* (2013.01); *F03D 7/045* (2013.01);
(Continued)

(58) Field of Classification Search
CPC .. F03D 7/0292; F03D 7/048; F05B 2270/332; F05B 2270/20; F05B 2270/404;
(Continued)

(56) References Cited

U.S. PATENT DOCUMENTS 8,355,823 B2  1/2013  Zhang et al.
8,495,911 B2  7/2013  Andersen et al.
(Continued)

FOREIGN PATENT DOCUMENTS

CN  1880756 A   12/2006
CN  101363405 A  2/2009
(Continued)

OTHER PUBLICATIONS

State Intellectual Property Office (SIPO) of the People's Republic Notification of the First Office Action for Application No. 201680038810.3 dated Nov. 30, 2018.
(Continued)

*Primary Examiner* — Michael J Dalbo
(74) *Attorney, Agent, or Firm* — Patterson + Sheridan, LLP

(57) ABSTRACT

A control schedule for a wind turbine indicates how the turbine maximum power level varies over time. Generating the schedule includes determining a value indicative of the current remaining fatigue lifetime of the turbine, or one or more turbine components, based on measured wind turbine
(Continued)

site and/or operating data; applying an optimisation function that varies an initial control schedule to determine an optimised control schedule by varying the trade-off between energy capture and fatigue life consumed by the turbine or the one or more turbine components until an optimised control schedule is determined.

26 Claims, 9 Drawing Sheets

(51) Int. Cl.
*F03D 7/02* (2006.01)
*F03D 80/50* (2016.01)
*G06F 30/17* (2020.01)
*G06F 30/20* (2020.01)

(52) U.S. Cl.
CPC ............ *F03D 7/046* (2013.01); *F03D 7/047* (2013.01); *F03D 7/048* (2013.01); *F03D 80/50* (2016.05); *G06F 30/17* (2020.01); *G06F 30/20* (2020.01); *F05B 2270/20* (2013.01); *F05B 2270/332* (2013.01); *F05B 2270/335* (2013.01); *G05B 2219/2619* (2013.01); *Y02E 10/72* (2013.01)

(58) Field of Classification Search
CPC .......... Y02E 10/723; G05B 2219/2619; G05B 2219/021
See application file for complete search history.

(56) References Cited

U.S. PATENT DOCUMENTS

| | | | |
|---|---|---|---|
| 9,035,479 | B1 | 5/2015 | Gates |
| 9,097,236 | B2 | 8/2015 | Zhou et al. |
| 2005/0209713 | A1 | 9/2005 | Fuller |
| 2010/0332272 | A1 | 12/2010 | Ong et al. |
| 2011/0123331 | A1 | 5/2011 | Stiesdal |
| 2011/0191033 | A1* | 8/2011 | Sandvad ................. F03D 80/50 702/33 |
| 2012/0065788 | A1 | 3/2012 | Harper, III et al. |
| 2012/0325290 | A1 | 12/2012 | Gizara |
| 2013/0035798 | A1 | 2/2013 | Zhou et al. |
| 2013/0103202 | A1 | 4/2013 | Bowyer et al. |
| 2013/0257051 | A1 | 10/2013 | Spruce et al. |
| 2013/0270827 | A1 | 10/2013 | Couchman et al. |
| 2014/0028123 | A1 | 1/2014 | Madsen et al. |
| 2014/0028855 | A1 | 1/2014 | Pryor |
| 2014/0030089 | A1 | 1/2014 | Wickstrom |
| 2014/0248123 | A1 | 9/2014 | Turner et al. |
| 2014/0288655 | A1 | 9/2014 | Deshpande |
| 2014/0324495 | A1 | 10/2014 | Zhou et al. |
| 2015/0108763 | A1 | 4/2015 | Yogev |
| 2015/0115608 | A1* | 4/2015 | Draper ..................... F03D 80/82 290/44 |
| 2015/0167637 | A1* | 6/2015 | Kooijman ............. F03D 7/0292 416/1 |
| 2018/0171979 | A1 | 6/2018 | Spruce |
| 2018/0173215 | A1* | 6/2018 | Spruce ................. F03D 7/0292 |

FOREIGN PATENT DOCUMENTS

| | | |
|---|---|---|
| CN | 101793228 A | 8/2010 |
| CN | 102072085 A | 5/2011 |
| CN | 102782318 A | 11/2012 |
| CN | 103237984 A | 8/2013 |
| CN | 103328818 A | 9/2013 |
| CN | 103547976 A | 1/2014 |
| DK | 201170539 A | 3/2013 |
| EP | 2264314 A2 | 12/2010 |
| EP | 2267305 A2 | 12/2010 |
| EP | 2325480 A1 | 5/2011 |
| EP | 2557311 A1 | 2/2013 |
| EP | 2631472 A2 | 8/2013 |
| EP | 2766600 B1 | 2/2018 |
| GB | 2498458 A | 7/2013 |
| JP | H0299215 A | 4/1990 |
| WO | 2005038613 A2 | 4/2005 |
| WO | 2011095519 A2 | 8/2011 |
| WO | 2012/041326 A2 | 4/2012 |
| WO | 2013023702 A1 | 2/2013 |
| WO | 2013044925 A1 | 4/2013 |
| WO | 2014149364 A1 | 9/2014 |
| WO | 2014187461 A1 | 11/2014 |
| WO | 2015014368 A1 | 2/2015 |
| WO | 2017000950 A1 | 1/2017 |
| WO | 2017000951 A1 | 1/2017 |
| WO | 2017000952 A1 | 1/2017 |
| WO | 2017000963 A1 | 1/2017 |
| WO | 2017000964 A1 | 1/2017 |

OTHER PUBLICATIONS

State Intellectual Property Office (SIPO) of the People's Republic of China Notification of the First Office Action for Application No. 201680038846.1 dated Dec. 4, 2018.
State Intellectual Property Office (SIPO) of the People's Republic of China Notification of the First Office Action for Application No. 201680038986.9 dated Dec. 5, 2018.
State Intellectual Property Office (SIPO) of the People's Republic of China Notification of the First Office Action for application No. 201680039098.9 dated Dec. 5, 2018.
State Intellectual Property Office (SIPO) of the People's Republic of China Notification of the First Office Action for Application No. 201680038982.0 dated Dec. 10, 2018.
PCT Written Opinion of the International Searching Authority for Application No. PCT/DK2016/050204 dated Jun. 21, 2016.
Poul S0rensen et al: "Operation and control of large wind turbines and wind farms—Final report", Sep. 30, 2005, pp. 1-44, XP055240228, ISBN: 978-87-5503-469-3.
PCT International Search Report for Application No. PCT/DK2016/050204 dated Jun. 21, 2016.
Danish Patent and Trademark Office Search Report for Application No. PA 2015 70541 dated Feb. 29, 2016.
DK Search Report for Application No. PA 2015 70540 dated Feb. 22, 2016.
PCT Written Opinion of the International Searching Authority for Application No. PCT/DK2016/050226 dated Jun. 29, 2016.
PCT Written Opinion of the International Serching Authority for Application No. PCT/DK2016/050203 dated Jun. 21, 2016.
Poul Sorensen et al: "Operation and control of large wind turbines and wind farms—Final report", Sep. 30, 2005, pp. 1-44, XP055240228, ISBN: 978-87-5503-469-3.
Danish Patent and Trademark Office Search Report for Application No. PA 2015 70559 dated Feb. 16, 2017.
International Search Report for Application PCT/DK2016/050203 dated Sep. 19, 2016.
Danish Patent and Trademark Office Search Report for Application No. PA 2015 70415 dated Jan. 29, 2016.
International Search Report for Application No. PCT/DK2016/050208 dated Sep. 19. 2016.
PCT International Search Report for Application No. PCT/DK2016/050226 dated Jun. 25, 2016.
Danish Patent and Trademark Office Search Report for Application No. PA 2015 70416 dated Jan. 29, 2016.
PCT International Search Report for Application No. PCT/DK2016/050227 dated Jun. 29, 2016.

* cited by examiner

METHODS AND SYSTEMS FOR GENERATING WIND TURBINE CONTROL SCHEDULES

Embodiments of the present invention relate to methods and systems for determining a control schedule for wind turbine power output.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller, which may be located at the tower base or tower top, for example. The wind turbine controller processes inputs from sensors and other control systems and generates output signals for actuators such as pitch actuators, generator torque controller, generator contactors, switches for activating shaft brakes, yaw motors etc.

FIG. 1B shows, schematically, an example of a conventional wind power plant 100 comprising a plurality of wind turbines 110, the controller of each of which communicates with a power plant controller (PPC) 130. The PPC 130 can communicate bi-directionally with each turbine. The turbines output power to a grid connection point 140 as illustrated by the thick line 150. In operation, and assuming that wind conditions permit, each of the wind turbines 110 will output maximum active power up to their rated power as specified by the manufacturer.

FIG. 2 illustrates a conventional power curve 55 of a wind turbine plotting wind speed on the x axis against power output on the y axis. Curve 55 is the normal power curve for the wind turbine and defines the power output by the wind turbine generator as a function of wind speed. As is well known in the art, the wind turbine starts to generate power at a cut-in wind speed $V_{min}$. The turbine then operates under part load (also known as partial load) conditions until the rated wind speed is reached at point $V_R$. At the rated wind speed the rated (or nominal) generator power is reached and the turbine is operating under full load. The cut-in wind speed in a typical wind turbine may be 3 m/s and the rated wind speed may be 12 m/s, for example. Point $V_{max}$ is the cut-out wind speed which is the highest wind speed at which the wind turbine may be operated while delivering power. At wind speeds equal to, and above, the cut-out wind speed the wind turbine is shut down for safety reasons, in particular to reduce the loads acting on the wind turbine. Alternatively the power output may be ramped down as a function of wind-speed to zero power.

The rated power of a wind turbine is defined in IEC 61400 as the maximum continuous electrical power output that a wind turbine is designed to achieve under normal operating and external conditions. Large commercial wind turbines are generally designed for a lifetime of 20 to 25 years and are designed to operate at the rated power so that the design loads and fatigue life of components are not exceeded.

The fatigue damage accumulation rates of individual components in wind turbines vary substantially under different operating conditions. The rate of wear, or accumulation of damage, tends to increase as generated power increases. Wind conditions also affect rate of accumulation of damage. For some mechanical components, operation in very high turbulence causes a rate of accumulation of fatigue damage that is many times higher than in normal turbulence. For some electrical components, operation at very high temperatures, which may be caused by high ambient temperatures, causes a rate of accumulation of fatigue damage, such as insulation breakdown rate, that is many times higher than in normal temperatures. As an example, a rule of thumb for generator windings is that a 10° C. decrease in winding temperature increases lifetime by 100%.

The Annual Energy Production (AEP) of a wind power plant relates to the productivity of the wind turbines forming the wind power plant and typically is dependent on the annual wind speeds at the location of the wind power plant. The greater the AEP for a given wind power plant the greater the profit for the operator of the wind power plant and the greater the amount of electrical energy supplied to the grid.

Thus, wind turbine manufacturers and wind power plant operators are constantly attempting to increase the AEP for a given wind power plant.

One such method may be to over-rate the wind turbines under certain conditions, in other words, allow the wind turbines to operate up to a power level that is above the rated or name-plate power level of the wind turbines for a period of time, as indicated by shaded area 58 of FIG. 2, in order to generate more electrical energy when winds are high and accordingly increase the AEP of a wind power plant. In particular, the term "over-rating" is understood to mean producing more than the rated active power during full load operation by controlling turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not reactive power. When the turbine is over-rated, the turbine is run more aggressively than normal, and the generator has a power output which is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require shut down of the turbine for maintenance. As such, over-rating is characterised by a transient behaviour. When a turbine is over-rated it may be for as short as a few seconds, or for an extended period of time if the wind conditions and the fatigue life of the components are favourable to over-rating.

Whilst over-rating allows turbine operators to increase AEP and to otherwise modify power generation to suit their requirements there are several problems and drawbacks associated with over-rating wind turbines. Wind turbines are typically designed to operate at a given nominal rated power level or name-plate power level and to operate for a certified number of years, e.g. 20 years or 25 years. Therefore, if the wind turbine is over-rated then the lifetime of the wind turbine may be reduced.

The present invention seeks to provide flexibility to the turbine operator to operate their turbines in a manner that suits their requirements, for example by returning an optimised AEP.

SUMMARY OF THE INVENTION

The invention is defined in the independent claims to which reference is now directed. Preferred features are set out in the dependent claims.

Embodiments of the invention seek to improve the flexibility available to the turbine operator when employing control methods that trade off energy capture and fatigue loads. An example of such a control method is the use of over-rating.

According to a first aspect of the invention there is provided a method of generating a control schedule for a wind turbine, the control schedule indicating how the turbine maximum power level varies over time, the method comprising:
  receiving input indicative of a target minimum wind turbine lifetime;
  determining a value indicative of the current remaining fatigue lifetime of the wind turbine or one or more turbine components, based on measured wind turbine site and/or operating data;
  varying a parameter of an initial predefined control schedule that specifies how the turbine maximum power level varies over time by:
    i) adjusting the parameter of the initial predefined control schedule;
    ii) estimating the future fatigue lifetime consumed by the wind turbine or the one or more turbine components, over the duration of the varied control schedule, based upon the varied control schedule; and
    iii) repeating steps (i) and (ii) until the estimated future fatigue lifetime consumed by the wind turbine or each of the one or more turbine components is sufficient to allow the target minimum wind turbine life to be reached.

The parameter may be varied until the estimated future fatigue lifetime consumed for the most heavily loaded component is sufficient to allow the target minimum wind turbine life to be just reached, or in other words such that the total fatigue life consumed will be substantially the same as the target minimum wind turbine life. This may be achieved based on a predetermined margin of the target minimum wind turbine life (e.g. within 0 to 1, 0 to 3, 0 to 6, or 0 to 12 months of the target for example).

Optionally step (iii) further requires maximising energy capture over the lifetime of the turbine.

Optionally the control schedule indicates the amount of power by which the wind turbine may be over-rated above its rated power.

Optionally the method further comprises receiving, for each of one or more of the turbine components, input indicative of a maximum number of permitted replacements for that turbine component. Step (i) may then further include adjusting, for one or more of the turbine components, the number of times that component may be replaced over the remaining lifetime of the turbine. Step (i) may also further include adjusting, for one or more of the turbine components, when the component may be replaced during the remaining lifetime of the turbine. The one or more turbine components may include one or more of: the blades, pitch bearing, pitch actuation system, hub, main shaft, main bearing, gearbox, generator, converter, yaw drive, yaw bearing or transformer.

Optionally, the initial predefined control schedule specifies the relative variation of the turbine maximum power level over time.

Optionally, determining a value indicative of the current remaining fatigue lifetime of the turbine or the one or more turbine components comprises applying sensor data from one or more turbine sensors to one or more lifetime usage estimation algorithms.

Optionally, determining a value indicative of the current remaining fatigue lifetime of the turbine or one or more turbine components comprises using data from a condition monitoring system.

Optionally, determining a value indicative of the current remaining fatigue lifetime of the turbine or one or more turbine components comprises using data obtained from wind power plant sensors in combination with a site check program that determines loads acting on turbine components based upon the data obtained from wind power plant sensors and parameters relating to the wind power plant and the wind turbine design. The sensor data may include sensor data collected prior to commissioning and/or construction of the wind turbine or wind power plant.

Optionally, adjusting the parameter comprises applying an offset, amplification, de-amplification or gain factor to the control schedule. The parameter is adjusted until all, or substantially all, of the fatigue life of the most heavily loaded component is consumed over the duration of the schedule. The offset may be adjusted by equalising the areas of the curve above and below a line showing fatigue damage incurred for the individual turbine operating with a maximum power level set at the site specific capability for the desired lifetime. The offset may be adjusted until the fatigue damage incurred over time due to operating the turbine according to the control schedule is equal to the fatigue damage incurred over time due to operating the turbine according to a constant maximum power level set at the individual turbine maximum power level for the target minimum lifetime.

Optionally the initial predefined control schedule specifies a gradient of the variation of maximum power level over time. Adjusting the parameter may then comprise adjusting the gradient.

Optionally the control schedule is indicative of the amount of fatigue damage that should be incurred over time, the method further comprising operating the wind turbine, based on one or more LUEs, to incur fatigue damage at the rate indicated by the control schedule.

Optionally the method further comprises providing the determined control schedule to a wind turbine controller to control the power output of a wind turbine.

The method may be performed once only, or irregularly as desired. Alternatively the method may be repeated periodically. In particular, the method may be repeated daily, monthly or annually.

A corresponding controller for a wind turbine or wind power plant configured to perform the methods described herein may be provided.

Still according to the first aspect, a method is provided for generating a control schedule for a wind power plant comprising two of more wind turbines, the control schedule indicating, for each wind turbine, how the maximum power level varies over time, the method comprising:

receiving input indicative of a target minimum desired lifetime for each turbine;

determining a value indicative of the current remaining fatigue lifetime of each of the wind turbines or one or more turbine components of each of the wind turbines, based on measured wind turbine site and/or operating data;

varying a parameter of an initial predefined control schedule that specifies how the power plant maximum power level varies over time by:
i) adjusting the parameter of the initial predefined control schedule;
ii) estimating the future fatigue lifetime consumed by the wind turbines or the one or more turbine components, over the duration of the varied control schedule based upon the varied control schedule, using a site check program that determines loads acting on turbine components based upon data obtained from wind power plant sensors and parameters relating to the wind power plant and the wind turbine design and includes interactions between the turbines of the wind power plant; and
iii) repeating steps (i) and (ii) until the estimated future fatigue lifetime consumed by the wind turbines or each of the one or more turbine components is sufficient to allow the target minimum wind turbine life to be reached.

Optionally, the sensor data includes sensor data collected prior to commissioning and/or construction of the wind turbine or wind power plant.

Optionally, step (iii) is further constrained such that for any given time period within the schedule, when the power of all of the turbines is added together it does not exceed the amount of power that can be carried in the connection from the power plant to the grid.

According to a second aspect of the invention there is provided a method of generating a control schedule for a wind turbine, the control schedule indicating how the turbine maximum power level varies over time, the method comprising:

receiving input indicative of the maximum number of times that each of one or more turbine components are to be replaced over the remaining lifetime of the turbine;

determining a value indicative of the current remaining fatigue lifetime of the turbine, or one or more of the turbine components, based on measured wind turbine site and/or operating data;

varying a parameter of an initial predefined control schedule that specifies how the turbine maximum power level varies over time, by:
iv) adjusting the parameter of the initial predefined control schedule;
v) estimating the future fatigue lifetime consumed by the wind turbine, or one or more turbine components, over the duration of the varied control schedule, based upon the varied control schedule and accounting for the replacements of the one or more turbine components; and
vi) repeating steps (i) and (ii) until the estimated future fatigue lifetime consumed by the wind turbine or each of the one or more turbine components is sufficient to allow a target minimum wind turbine life to be reached.

The parameter may be varied until the estimated future fatigue lifetime consumed for the most heavily loaded component is sufficient to allow the target minimum wind turbine life to be just reached, or in other words such that the total fatigue life consumed will be substantially the same as the target minimum wind turbine life. This may be achieved based on a predetermined margin of the target minimum wind turbine life (e.g. within 0 to 1, 0 to 3, 0 to 6, or 0 to 12 months of the target for example).

Optionally step (iii) further requires maximising energy capture over the lifetime of the turbine.

Optionally the control schedule indicates the amount of power by which the wind turbine may be over-rated above its rated power.

Optionally step (i) further includes adjusting, for one or more of the turbine components, the number of times that component may be replaced over the remaining lifetime of the turbine. Step (i) may further include adjusting, for one or more of the turbine components, when the component may be replaced during the remaining lifetime of the turbine.

Optionally the target minimum wind turbine life is a predetermined target value corresponding to the turbine design lifetime.

Optionally the method further comprises receiving input indicative of a user defined target minimum wind turbine lifetime.

Optionally the initial predefined control schedule specifies the relative variation of the turbine maximum power level over time.

Optionally determining a value indicative of the current remaining fatigue lifetime of the turbine or the one or more turbine components comprises applying sensor data from one or more turbine sensors to one or more lifetime usage estimation algorithms.

Optionally determining a value indicative of the current remaining fatigue lifetime of the turbine or one or more turbine components comprises using data from a condition monitoring system.

Optionally determining a value indicative of the current remaining fatigue lifetime of the turbine or one or more turbine components comprises using data obtained from wind power plant sensors in combination with a site check program that determines loads acting on turbine components based upon the data obtained from wind power plant sensors and parameters relating to the wind power plant and the wind turbine design. The sensor data may include sensor data collected prior to commissioning and/or construction of the wind turbine or wind power plant.

Optionally, adjusting the parameter comprises applying an offset, amplification, de-amplification or gain factor to the control schedule. The parameter is adjusted until all, or substantially all, of the fatigue life of the most heavily loaded component is consumed over the duration of the schedule. The offset may be adjusted by equalising the areas of the curve above and below a line showing fatigue damage incurred for the individual turbine operating with a maximum power level set at the site specific capability for the desired lifetime. The offset may be adjusted until the fatigue damage incurred over time due to operating the turbine according to the control schedule is equal to the fatigue damage incurred over time due to operating the turbine according to a constant maximum power level set at the individual turbine maximum power level for the target minimum lifetime.

Optionally the initial predefined control schedule specifies a gradient of the variation of maximum power level over time. Adjusting the parameter may comprise adjusting the gradient.

Optionally the control schedule is indicative of the amount of fatigue damage that should be incurred over time, the method further comprising operating the wind turbine, based on one or more LUEs, to incur fatigue damage at the rate indicated by the control schedule.

Optionally the method further comprises providing the determined control schedule to a wind turbine controller to control the power output of a wind turbine.

Optionally the one or more turbine components include one or more of: the blades, pitch bearing, pitch actuation system, hub, main shaft, main bearing, gearbox, generator, converter, yaw drive, yaw bearing or transformer.

The method may be performed once only, or irregularly as desired. Alternatively the method may be repeated periodically. In particular, the method may be repeated daily, monthly or annually.

A corresponding controller for a wind turbine or wind power plant configured to perform the methods described herein may be provided.

Still according to the second aspect, a method is provided for generating a control schedule for a wind power plant comprising two of more wind turbines, the control schedule indicating, for each wind turbine, how the maximum power level varies over time, the method comprising:
receiving input indicative of the maximum number of times that each of one or more turbine components, for each turbine, are to be replaced over the remaining lifetime of the turbine;
determining a value indicative of the current remaining fatigue lifetime of each of the wind turbines or one or more turbine components of each of the wind turbines, based on measured wind turbine site and/or operating data;
varying a parameter of an initial predefined control schedule that specifies how the power plant maximum power level varies over time by:
iv) adjusting the parameter of the initial predefined control schedule;
v) estimating the future fatigue lifetime consumed by the wind turbines or the one or more turbine components, over the duration of the varied control schedule, based upon the varied control schedule and accounting for the replacement of the one or more turbine components using a site check program that determines loads acting on turbine components based upon data obtained from wind power plant sensors and parameters relating to the wind power plant and the wind turbine design and includes interactions between the turbines of the wind power plant; and
vi) repeating steps (i) and (ii) until the estimated future fatigue lifetime consumed by the wind turbines or each of the one or more turbine components is sufficient to allow the target minimum wind turbine life to be reached.

Optionally, the sensor data includes sensor data collected prior to commissioning and/or construction of the wind turbine or wind power plant.

Optionally, step (iii) is further constrained such that for any given time period within the schedule, when the power of all of the turbines is added together it does not exceed the amount of power that can be carried in the connection from the power plant to the grid.

According to a third aspect of the invention there is provided a method of generating a control schedule for a wind turbine, the control schedule indicating how the turbine maximum power level varies over time, the method comprising:
determining a value indicative of the current remaining fatigue lifetime of the turbine, or one or more turbine components, based on measured wind turbine site and/or operating data;
applying an optimisation function that varies an initial control schedule to determine an optimised control schedule by varying the trade-off between energy capture and fatigue life consumed by the turbine or the one or more turbine components until an optimised control schedule is determined, the optimisation including:
estimating future fatigue lifetime consumed by the turbine or turbine component over the duration of the varied control schedule based on the current remaining fatigue lifetime and the varied control schedule; and
constraining the optimisation of the control schedule according to one or more input constraints;
wherein the input constraints include a maximum number of permitted component replacements for one or more turbine components and the optimisation further includes varying an initial value for a wind turbine lifetime to determine a target wind turbine lifetime.

According to a fourth aspect of the invention there is provided a method of generating a control schedule for a wind turbine, the control schedule indicating how the turbine maximum power level varies over time, the method comprising:
determining a value indicative of the current remaining fatigue lifetime of the turbine, or one or more turbine components, based on measured wind turbine site and/or operating data;
applying an optimisation function that varies an initial control schedule to determine an optimised control schedule by varying the trade off between energy capture and fatigue life consumed by the turbine or the one or more turbine components until an optimised control schedule is determined, the optimisation including:
estimating future fatigue lifetime consumed by the turbine or turbine component over the duration of the varied control schedule based on the current remaining fatigue lifetime and the varied control schedule; and
constraining the optimisation of the control schedule according to one or more input constraints;
wherein the input constraints include a target minimum wind turbine lifetime and the optimisation further includes varying an initial value for the number of component replacements, for one or more components, to be performed over the course of the schedule to determine a maximum number of component replacements.

According to a fifth aspect of the invention there is provided a method of generating a control schedule for a wind turbine, the control schedule indicating how the turbine maximum power level varies over time, the method comprising:

determining a value indicative of the current remaining fatigue lifetime of the turbine, or one or more turbine components, based on measured wind turbine site and/or operating data;

applying an optimisation function that varies an initial control schedule to determine an optimised control schedule by varying the trade-off between energy capture and fatigue life consumed by the turbine or the one or more turbine components until an optimised control schedule is determined, the optimisation including:

estimating future fatigue lifetime consumed by the turbine or turbine component over the duration of the varied control schedule based on the current remaining fatigue lifetime and the varied control schedule; and constraining the optimisation of the control schedule according to one or more input constraints;

wherein the optimisation further includes varying an initial value for a wind turbine lifetime, and varying an initial value for the number of component replacements, for one or more components, to be performed over the course of the schedule to determine a combination of the number of component replacements for one or more turbine components and a target minimum wind turbine lifetime.

The following optional features may apply to the third, fourth or fifth aspects.

The control schedule may apply over the whole lifetime of the turbine

Optionally the method further comprises optimising the control schedule by varying the timing and the number of component replacements up to the maximum number.

Optionally the one or more turbine components that can be replaced include one or more of: the blades, pitch bearing, pitch actuation system, hub, main shaft, main bearing, gearbox, generator, converter, yaw drive, yaw bearing or transformer.

Optionally the initial control schedule specifies the relative variation over time of the turbine maximum power level up to which the turbine may operate.

Optionally the input constraints further comprise the upper maximum power output of the turbine allowed by the turbine design and/or the minimum power output of the turbine.

Optionally determining a value indicative of the current remaining fatigue lifetime of the turbine or one or more turbine components comprises applying sensor data from one or more turbine sensors to one or more lifetime usage estimation algorithms.

Optionally determining a value indicative of the current remaining fatigue lifetime of the turbine or one or more turbine components comprises using data from a condition monitoring system.

Optionally determining a value indicative of the current remaining fatigue lifetime of the turbine or one or more turbine components comprises using data obtained from wind park sensors in combination with a site check program that determines loads acting on turbine components based upon the wind park sensors and parameters relating to the wind park and the wind turbine design.

Optionally optimisation of the control schedule comprises varying the control schedule to minimise the levelised cost of energy (LCoE). An LCoE model may be used to determine LCoE, the model including parameters for one or more of: capacity factor, indicative of the energy generated over a period divided by the energy that could have been generated if the turbine were to have operated continuously at rated power for that period; availability, indicative of the time the turbine will be available to generate electricity; and park efficiency, indicative of the energy generated over a period divided by the energy that could have been generated if the turbine were to have operated in wind that was wholly undisturbed by upstream turbines. The model may further includes parameters for one or more of: costs associated with replacing one or more components, including turbine downtime, labour and equipment for component replacement, manufacture or refurbishment costs of the replacement components, and transportation costs of the refurbished or replacement components to the power plant; and service costs associated with replacement of wear parts.

Optionally the optimised control schedule is a schedule of maximum power levels up to which the turbine can be operated, and may specify maximum power levels above the rated power of the wind turbine. Alternatively, the control schedule may specify the amount of fatigue damage that should be incurred over time, the method further comprising operating the wind turbine, based on one or more LUEs, to incur fatigue damage at the rate indicated by the control schedule.

The control schedule may indicate how the turbine maximum power level varies over the lifetime of the turbine.

Optionally the method may further comprise providing the optimised control schedule to a wind turbine controller or wind power plant controller to control the power output of a wind turbine.

Optionally the method is repeated periodically. The method may be repeated daily, monthly or annually.

A corresponding controller for a wind turbine or wind power plant configured to perform the methods of the third, fourth or fifth aspects described herein may be provided.

According to the third aspect there is provided an optimiser for generating a control schedule for a wind turbine, the control schedule indicating how the turbine maximum power level varies over time, the optimiser comprising:

an optimisation module configured to receive: initial values for a set of variables, being operating variables of the wind turbine and including an initial control schedule; one or more constraints; and data indicative of the current remaining fatigue lifetime of the turbine or one or more turbine components;

wherein the optimisation module is configured to:

optimise the control schedule by minimising or maximising an operation parameter received at the optimisation module that is dependent upon the set of variables by varying one or more of the variables from its initial value in accordance with the remaining fatigue lifetime of the turbine or the one or more turbine components and the one or more constraints; and output the optimised control schedule;

wherein the constraints include a maximum number of permitted component replacements for one or more turbine components and the optimisation module is further configured to vary an initial value for a wind turbine lifetime to determine a target wind turbine lifetime.

According to the fourth aspect there is provided an optimiser for generating a control schedule for a wind turbine, the control schedule indicating how the turbine maximum power level varies over time, the optimiser comprising:

an optimisation module configured to receive: initial values for a set of variables, being operating variables of the wind turbine and including an initial control schedule; one or more constraints; and data indicative of the current remaining fatigue lifetime of the turbine or one or more turbine components;

wherein the optimisation module is configured to:

optimise the control schedule by minimising or maximising an operation parameter received at the optimisation module that is dependent upon the set of variables by varying one or more of the variables from its initial value in accordance with the remaining fatigue lifetime of the turbine or the one or more turbine components and the one or more constraints; and output the optimised control schedule.

wherein the constraints include a target minimum wind turbine lifetime and the optimisation module is further configured to vary an initial value for the number of component replacements, for one or more components, to be performed over the course of the schedule to determine a maximum number of component replacements.

According to the fifth aspect there is provided an optimiser for generating a control schedule for a wind turbine, the control schedule indicating how the turbine maximum power level varies over time, the optimiser comprising:

an optimisation module configured to receive: initial values for a set of variables, being operating variables of the wind turbine and including an initial control schedule; one or more constraints; and data indicative of the current remaining fatigue lifetime of the turbine or one or more turbine components;

wherein the optimisation module is configured to:

optimise the control schedule by minimising or maximising an operation parameter received at the optimisation module that is dependent upon the set of variables by varying one or more of the variables from its initial value in accordance with the remaining fatigue lifetime of the turbine or the one or more turbine components and the one or more constraints; and output the optimised control schedule.

wherein the optimisation module is further configured to vary an initial value for a wind turbine lifetime, and vary an initial value for the number of component replacements, for one or more components, to be performed over the course of the schedule to determine a combination of the number of component replacements for one or more turbine components and a target minimum wind turbine lifetime.

The following optional features may apply to the optimisers of the third, fourth or fifth aspects.

Optionally the initial control schedule specifies the relative variation over time of the turbine maximum power level up to which the turbine may operate.

Optionally the optimiser further comprises an initialisation module configured to receive the initial values for the set of variables and the sensor data, the initialisation module being configured to calculate an initial value for the operation parameter.

Optionally the one or more turbine components are one or more of: the blades, pitch bearing, pitch actuation system, hub, main shaft, main bearing, gearbox, generator, converter, yaw drive, yaw bearing or transformer.

Optionally the operation parameter is the levelised cost of energy (LCoE) for the turbine, and optimising the control scheduled comprises minimising the levelised cost of energy (LCoE). A LCoE model may be used to determine LCoE, the model including parameters for one or more of: capacity factor, indicative of the energy generated over a period divided by the energy that could have been generated if the turbine were to have operated continuously at rated power for that period; availability, indicative of the time the turbine will be available to generate electricity; and park efficiency, indicative of the energy generated over a period divided by the energy that could have been generated if the turbine were to have operated in wind that was wholly undisturbed by upstream turbines. The model may further includes parameters for one or more of: costs associated with replacing one or more components, including turbine downtime, labour and equipment for component replacement, manufacture or refurbishment costs of the replacement components, and transportation costs of the refurbished or replacement components to the power plant; and service costs associated with replacement of wear parts.

A controller comprising an optimiser according to any of the third, fourth or fifth aspects may be provided.

According to the third aspect there is provided a method of generating a control schedule for a wind power plant comprising a plurality of wind turbines, the control schedule indicating, for each wind turbine, how the maximum power level varies over time, the method comprising:

determining a value indicative of the current remaining fatigue lifetime of each of the turbines, or one or more components of each of the turbines, based on measured wind turbine site and/or operating data;

applying an optimisation function that varies an initial control schedule of each of the turbines to determine an optimised control schedule by varying the trade off between energy capture and fatigue life consumed by each of the turbines or the one or more turbine components of each of the turbines until an optimised control schedule is determined, the optimisation including:

estimating future fatigue lifetime consumed by the turbines or turbine components over the duration of the varied control schedule based on the current remaining fatigue lifetime and the varied control schedule using a site check program that determines loads acting on turbine components based upon data obtained from wind power plant sensors and parameters relating to the wind power plant and the wind turbine design and includes interactions between the turbines of the wind power plant; and constraining the optimisation of the control schedule according to one or more input constraints;

wherein the constraints include a maximum number of permitted component replacements for each of one or more turbine components of each of the wind turbines, and the optimisation module is further configured to vary an initial value for a wind turbine lifetime to determine a target wind turbine lifetime.

According to the fourth aspect there is provided method of generating a control schedule for a wind power plant comprising a plurality of wind turbines, the control schedule indicating, for each wind turbine, how the maximum power level varies over time, the method comprising:

determining a value indicative of the current remaining fatigue lifetime of each of the turbines, or one or more components of each of the turbines, based on measured wind turbine site and/or operating data;

applying an optimisation function that varies an initial control schedule of each of the turbines to determine an optimised control schedule by varying the trade off between energy capture and fatigue life consumed by each of the turbines or the one or more turbine components of each of the turbines until an optimised control schedule is determined, the optimisation including:

estimating future fatigue lifetime consumed by the turbines or turbine components over the duration of the varied control schedule based on the current remaining fatigue lifetime and the varied control schedule using a site check program that determines loads acting on turbine components based upon data obtained from wind power plant sensors and parameters relating to the wind power plant and the wind turbine design and includes interactions between the turbines of the wind power plant; and constraining the optimisation of the control schedule according to one or more input constraints;

wherein the constraints include a target minimum wind turbine lifetime, for each of the wind turbines, and the optimisation module is further configured to vary an initial value for the number of component replacements, for one or more components of each of the wind turbines, to be performed over the course of the schedule to determine a maximum number of component replacements.

According to the fifth aspect there is provided a method of generating a control schedule for a wind power plant comprising a plurality of wind turbines, the control schedule indicating, for each wind turbine, how the maximum power level varies over time, the method comprising:

determining a value indicative of the current remaining fatigue lifetime of each of the turbines, or one or more components of each of the turbines, based on measured wind turbine site and/or operating data;

applying an optimisation function that varies an initial control schedule of each of the turbines to determine an optimised control schedule by varying the trade off between energy capture and fatigue life consumed by each of the turbines or the one or more turbine components of each of the turbines until an optimised control schedule is determined, the optimisation including:

estimating future fatigue lifetime consumed by the turbines or turbine components over the duration of the varied control schedule based on the current remaining fatigue lifetime and the varied control schedule using a site check program that determines loads acting on turbine components based upon data obtained from wind power plant sensors and parameters relating to the wind power plant and the wind turbine design and includes interactions between the turbines of the wind power plant; and constraining the optimisation of the control schedule according to one or more input constraints;

wherein the optimisation further includes varying an initial value for each of the wind turbine lifetimes, and varying an initial value for the number of component replacements, for one or more components of each of the wind turbines, to be performed over the course of the schedule to determine a combination of the number of component replacements for one or more turbine components for each of the wind turbines and a target minimum wind turbine lifetime for each of the wind turbines.

The following optional features may apply to the power plant level methods of the third, fourth or fifth aspects.

Optionally the initial control schedule specifies, for each turbine, the relative variation over time of the turbine maximum power level up to which the turbine may operate.

Optionally the sensor data includes sensor data collected prior to commissioning and/or construction of the wind turbine or wind power plant.

Optionally the optimisation function varies, for one or more of the turbine components, the number of times that component may be replaced over the remaining lifetime of the turbine. The optimisation function may vary, for one or more of the turbine components, when the component may be replaced during the remaining lifetime of the turbine.

Optionally the method is further constrained such that for any given time period within the schedule, when the power of all of the turbines is added together it does not exceed the amount of power that can be carried in the connection from the power plant to the grid.

A corresponding wind power plant controller configured to perform the above methods of the third, fourth or fifth aspects may be provided.

Any of the methods described herein may be embodied in software that when executed on a processor of a controller cause it to carry out the relevant method.

References made herein to site check software include site check tools known to the skilled person for simulating the operation of wind turbines to determine operating characteristics of wind turbines, and wind power plants, based upon pre-construction and/or pre-commissioning sensor data and other site information such as topography etc. The site check tool may also use operational data from the turbine or power plant, or from similar turbines or power plants, where this is available. Examples include the Vestas™ Site Check tool. An alternative site check software package is provided by DNV GL. It consists of three connected programs: "WindFarmer", "WindFarmer Bladed Link" and "Bladed" which allow a user to conduct the full range of performance and loading calculations.

BRIEF DESCRIPTION OF THE DRAWINGS

The invention will now be further described by way of example only and with reference to the accompanying figures in which.

DETAILED DESCRIPTION OF PREFERRED EMBODIMENTS

Figure 1A:
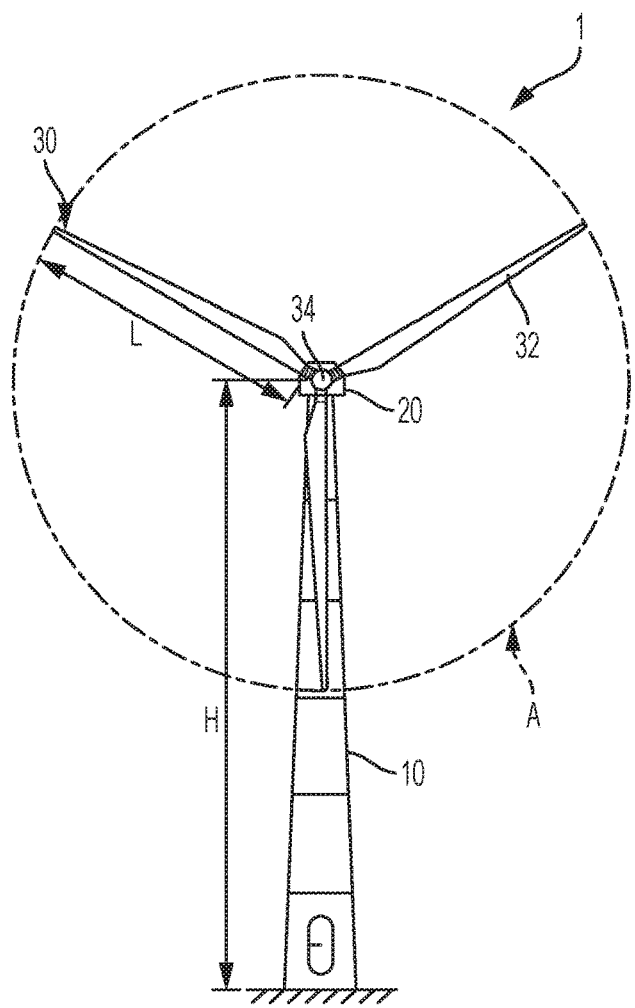
FIG. 1A is a schematic front view of a conventional wind turbine.

Embodiments of the invention seek to improve the flexibility available to the turbine operator when employing control methods that trade off energy capture and fatigue loads.

In particular, embodiments provide an optimisation method to allow a turbine operator to optimise turbine performance, such as AEP, according to their requirements.

In order to optimise performance, three parameters are available to vary in the overall wind turbine control strategy. These are (i) the power schedule of the wind turbine; (ii) the remaining lifetime of the wind turbine; and (iii) the number of component replacements permitted during the remaining lifetime of the wind turbine. One or more of these parameters may be varied relative to one or more of the other parameters to arrive at an optimised control strategy. The parameters may also be limited by constraints.

An optimisation may be performed to improve the AEP of a turbine over its lifetime and improve profitability, for example. The turbine operator may specify one or more constraints and then optimisation can be performed. The operator may request one or more of a minimum wind turbine life (e.g. 19 years), a maximum number of individual component replacements (e.g. one gearbox replacement) and/or a particular power schedule, schedule curve or shape, or schedule gradient.

The power schedule is the schedule of a variable used by the wind turbine controller to trade off energy capture and fatigue loads over the remaining turbine life, such as when over-rating the turbine. The additional power generated by over-rating a given turbine can be controlled by specifying the value of a variable such as the individual wind turbine maximum power level. This maximum power level specifies the power, above rated power, up to which the turbine may operate when over-rating. The power schedule may specify a constant maximum power level over the lifetime of the turbine. Alternatively the power schedule may specify a maximum power level that varies over the lifetime of the wind turbine so that the amount of additional power that can be generated by over-rating varies over time. For example, the power plant operator may wish to generate more power during the early years of the wind turbine life, at the expense of increased fatigue life consumption of the turbine components, because the financial value of generation in the early years of a project is disproportionally high.

The individual wind turbine maximum power level for a given turbine type is constrained by the ultimate load limits of the wind turbine mechanical components, and the design limits of the electrical components, since the maximum power cannot be safely increased beyond a level that would cause the turbine to experience mechanical load values or electrical loads higher than its ultimate design load limits. This upper maximum power level, beyond which the individual wind turbine maximum power level cannot exceed, may be referred to as the "wind turbine type maximum power level", and specifies the maximum power level at which the determined load does not exceed the design load for the type of wind turbine. An example of the manner in which the wind turbine type maximum power level may be calculated is given below, in the section "Maximum Power Level Calculation".

The individual wind turbine maximum power level is the power level specified in schedules according to embodiments of the invention, and may simply be referred to as the maximum power level. The individual wind turbine maximum power level may be refined for each individual turbine, being calculated based on the fatigue load values for each turbine, based on one or more of the conditions faced by each of the wind turbines at their specific location or position in the wind power plant, with individual wind turbine maximum power levels being determined for each turbine in a given site. The individual wind turbine maximum power level may then be set so that the rate of consumption of fatigue life by the turbine, or by individual turbine components, gives a fatigue life that corresponds to, or exceeds, the particular target lifetime.

The remaining lifetime of the wind turbine specifies the amount of operational life that the operator is willing to accept in order to optimise AEP. The remaining lifetime will depend upon the point in time from first activation at which the AEP optimisation method is implemented because available remaining lifetime decreases as the turbine operates.

The number of component replacements permitted during the remaining lifetime of the wind turbine can also be used to optimise AEP. As turbine components fatigue at different rates in different conditions, the actual lifetime of some components may be considerably more than the 20 year expected lifetime for a wind turbine, or equally the components could be capable of being over-rated by a greater amount for a given lifetime. Components having a longer lifetime are not driving the overall turbine life, and have spare production capacity. However, those components with a shorter lifetime may have a limiting effect on over-rating, and AEP can be increased by replacing one or more of these components during the lifetime of the turbine. In particular, over-rating, where achieved by increasing the torque, has a particularly big impact on the fatigue life of the gearbox, generator and power take-off components. In contrast, where over-rating is achieved by increasing rotor speed, then the fatigue life of the blades and structural components is more heavily impacted.

Replaceable components in the context of embodiments of the invention are considered to be major components, such as components that each account for 5% or more of the total wind turbine cost, and that may be replaced in the field. General wear components that account for only a small fraction of the total cost of the wind turbine do not need to be considered. In particular, the components considered for replacement could include one or more of the blades, pitch bearing, pitch actuation system, hub, main shaft, main bearing, gearbox, generator, converter, yaw drive, yaw bearing or transformer.

Figure 3:
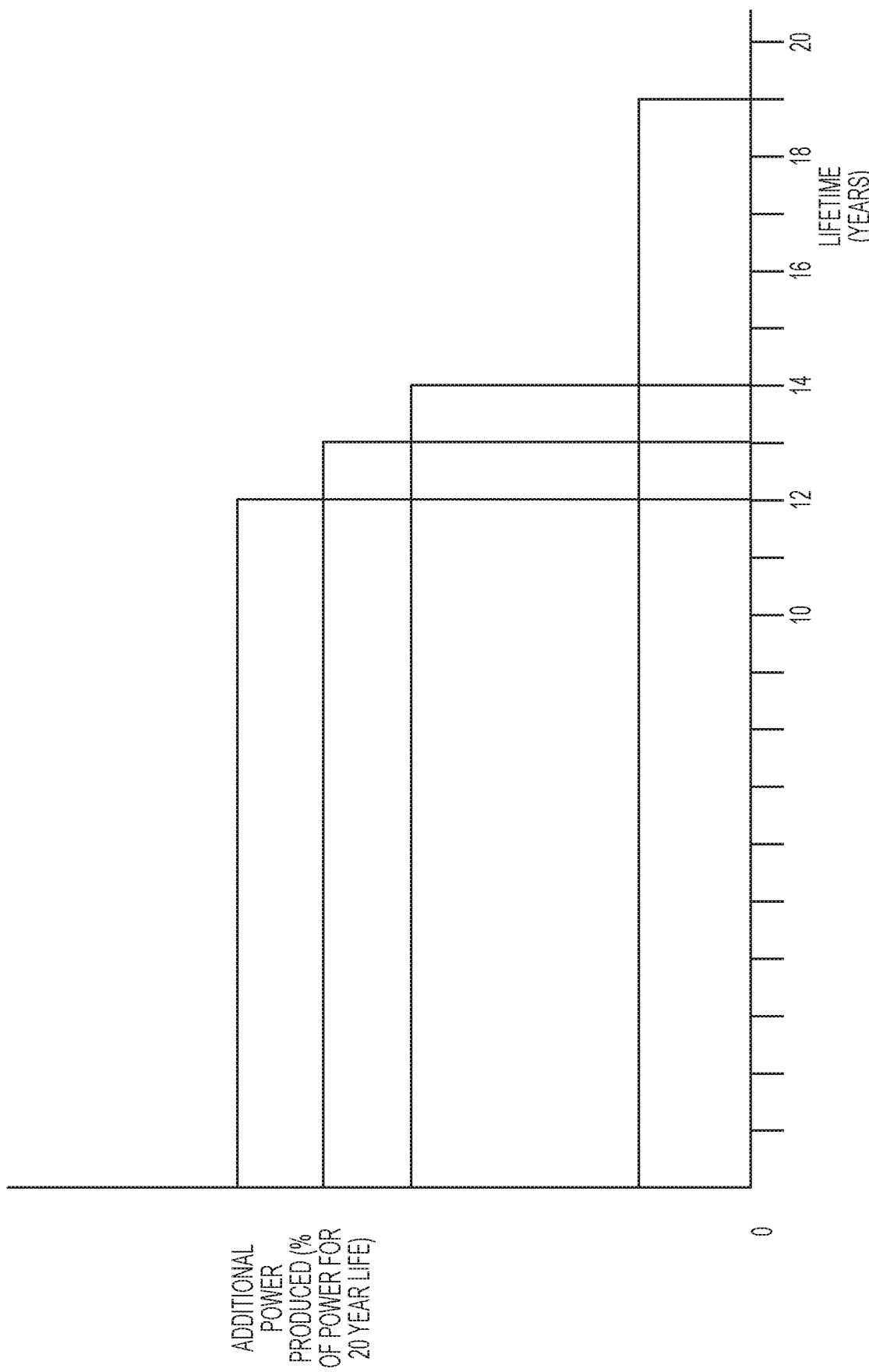
FIG. 3 is a graph illustrating how the power produced by a wind turbine over time may vary with the target lifetime of the turbine.

FIG. 3 shows a first example of optimisation, where a power schedule is varied against the target lifetime of the turbine. In this example, the design lifetime of the turbine is 20 years and the power level is fixed for the lifetime of the turbine. As can be seen, the amount of power produced in a given year increases as the wind turbine life is decreased. As the turbine lifetime is decreased, the rate of consumption of fatigue life of the turbine or turbine components can be increased, permitting additional power to be generated by over-rating. Optimisation can be applied depending upon the preferences of the turbine operator. For example the lifetime that maximises the AEP, net present value (NPV) or net present worth (NPW) of the turbine may be determined and selected. NPV/NPW can be calculated using known methods.

Figure 4:
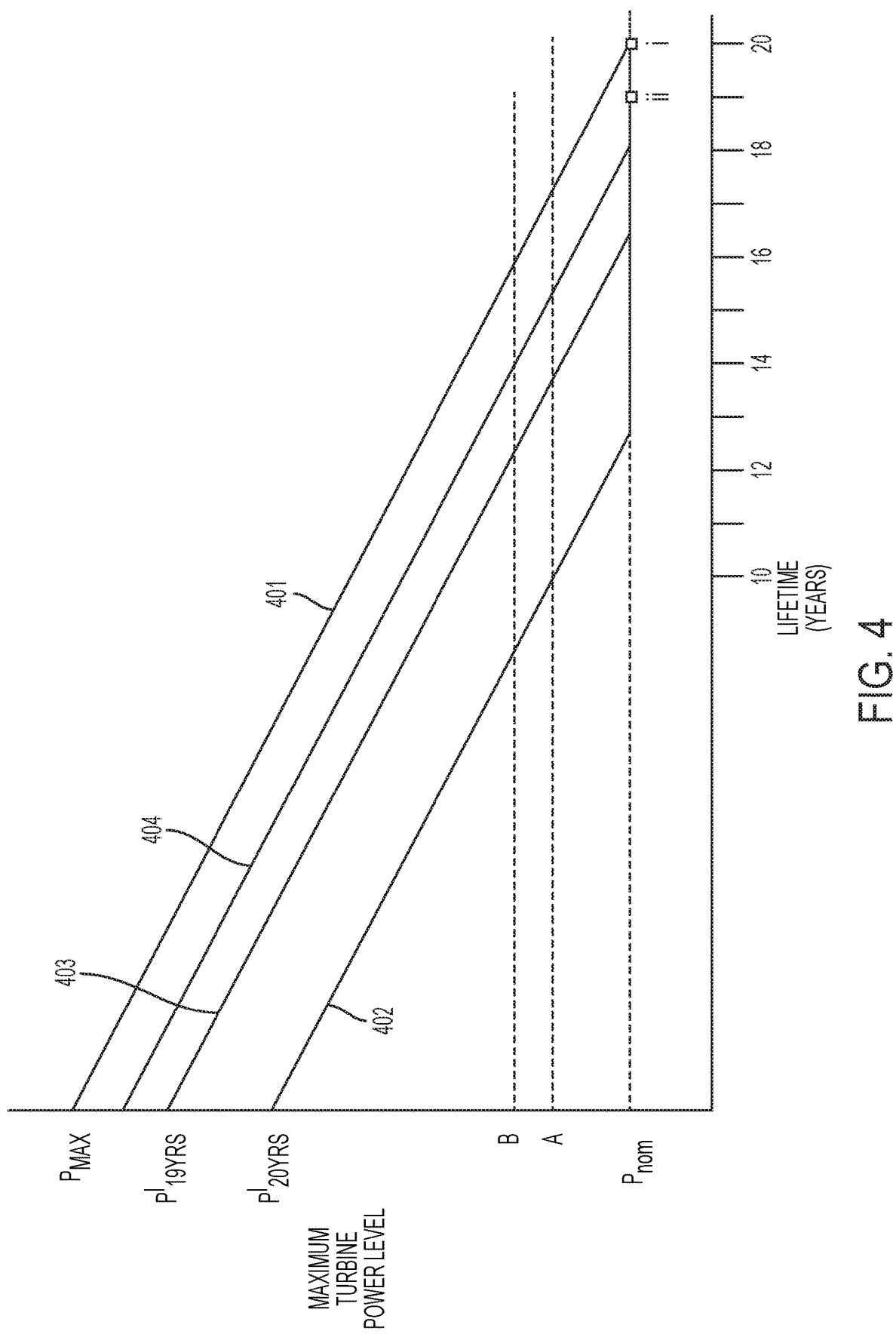
FIG. 4 is a graph showing different power schedules for a wind turbine in which the individual maximum wind turbine power level varies over the lifetime of the turbine to control power output.

FIG. 4 shows a further example of optimisation, where a power schedule is again varied against the target lifetime of the turbine. In this example, the maximum power level specified by the schedule is variable over the lifetime of the turbine. An initial schedule may be specified, for example the turbine operator may have a desired schedule shape to be used. The schedule defines how the individual wind turbine maximum power level varies over time, but may do so in a relative rather than absolute manner. In this example, the desired schedule 401 is a linear schedule from the wind turbine type maximum power level $P_{max}$ to the nominal or rated power level for the turbine type $P_{nom}$ over a 20 year turbine life. The individual turbine's site specific capability for a 20 year life is shown by dotted line A, for a typical example site on which the annual mean wind-speed is below the design wind speed of the turbine. It may not be possible for the desired schedule 401 to be met, for the specific turbine, without exceeding the fatigue lifetime of the turbine, or certain turbine components, over the turbine lifetime. The schedule is therefore adjusted until the total fatigue incurred according to the power schedule does not exceed the design fatigue lifetime of the most heavily loaded component.

This may be achieved by estimating the fatigue damage incurred by following the schedule over its duration, e.g. up to the turbine design life, or the turbine life specified by the user. The fatigue damage incurred may be estimated using the site check function, and may be supplemented with LUE data, both of which take into account the fatigue damage due to loads in view of given microsite conditions. The schedule can be adjusted until the resulting fatigue lifetime of the most heavily loaded component equals that of the design fatigue lifetime of that component. In other words, the schedule is adjusted until all or substantially all of the fatigue life of the most heavily loaded component is used up over the duration of the schedule.

The schedule may be adjusted by adjusting one or more parameters thereof. This may include:

- applying an offset to the schedule by adding or subtracting a value across the entire schedule;
- applying a gain of greater than or less than 1 to the schedule;
- any other appropriate function for the non-linear raising or lowering of the control schedule via adjustment of relevant parameters, to otherwise expand/contract or grow/shrink the schedule as appropriate to change the schedule power level values.

In one example, adjusting the schedule may be achieved based on an equivalent plot of fatigue damage incurred versus time, or fatigue life remaining versus time, for the most fatigued component, determined from the power schedule plot and using site check software to determine the fatigue damage to components that would be incurred at given power levels, at the particular turbine location within the power plant (otherwise known as the turbine microsite). The plot is adjusted until the areas defined by each schedule above and below the respective capability line on the equivalent fatigue curve, applicable to the desired turbine life, are equal. For example, this may be achieved by equalising the areas of the curve above and below a line showing fatigue damage incurred for the individual turbine operating with a constant maximum power level set at the site specific capability for the desired lifetime. For example this would be a line equivalent to the dotted line A of FIG. 3, but showing the fatigue damage incurred for the individual wind turbine maximum power over time. Area equalisation can be achieved by moving the power schedule curve up or down by adding or subtracting an offset to the curve until the areas are equalised, or otherwise amplifying or contracting the curve by adjusting one or more parameters of the curve. The total fatigue life consumed by the turbine or turbine components will then reach 20 years of operation. An example schedule is shown by line 402, which terminates at black square i.

The turbine's site specific capability for a 19 year life for the same example site is shown by dotted line B. As can be seen, the capability over a 19 year life is higher than that over a 20 year life. As such, a resulting 19 year schedule, an example of which is given by line 403, may have a higher initial maximum power level value, $P^I_{19yrs}$, to that of a 20 year life schedule 402, $P^I_{20yrs}$. Schedule 403 terminates at 19 years, indicated by black square ii.

In the examples of FIG. 4, the schedule adjustments are subject to the additional constraint that the slope or gradient of the schedule should equal that of the initial schedule 401 for a 20 year lifetime. A further constraint may also be applied, as used in the example of FIG. 4, whereby the slope of the schedule equals that of the initial schedule 401 only until a nominal power level is reached, which may be the rated power of the turbine, at from which point onwards the maximum power level is maintained at the nominal power level. Alternatively, embodiments may employ de-rating of the turbine so that the maximum power levels specified by the schedule can be set to levels below the rated power of the turbine.

The schedules are adjusted in a stepwise manner, either being decreased from $P_{max}$, or increased from $P_{nom}$, or from the power value of line A, until an appropriate schedule is reached for which there is sufficient fatigue lifetime in the most heavily loaded turbine component to reach the target turbine lifetime. For example, the initial maximum power level $P^I$ may be increased or decreased in steps of 1% of $P_{nom}$ until an appropriate schedule is reached.

Other possibilities exist for optimising the power schedule according to the number of years of turbine life. For example, the schedules may all start from the same initial value (e.g. $P_{max}$) and the gradient varied until the areas defined by each schedule above and below the respective capability line on the equivalent fatigue curve, applicable to the desired turbine life, are equal.

Figure 5:
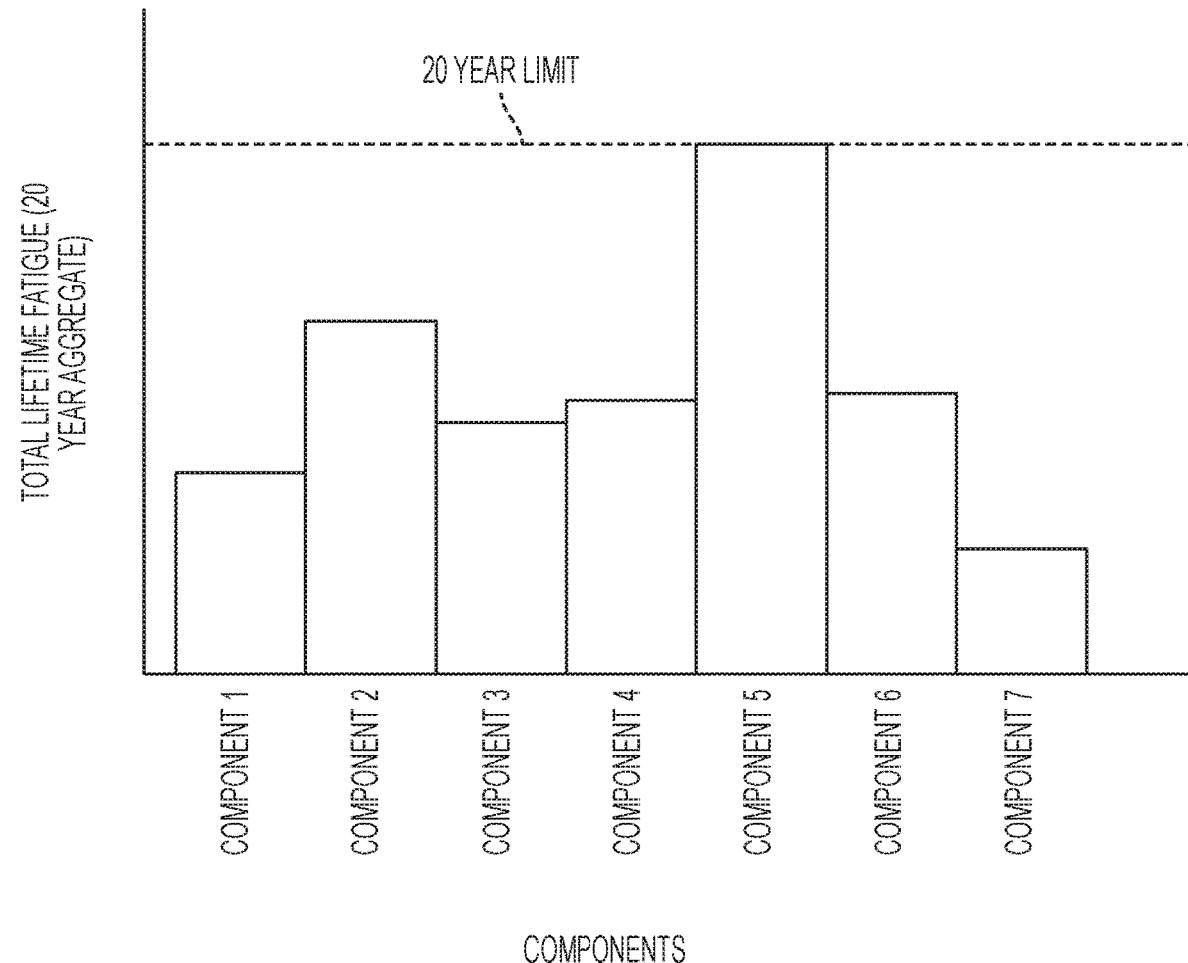
FIG. 5 is a graph showing example variations in total lifetime fatigue accumulated between different turbine components.

A further line 404 shows an example of a schedule that may be achieved for a turbine over a 20 year life if one or more component replacements are factored in. The schedule 404 terminates at black box i. One or more components may be particularly susceptible to fatigue damage caused by over-rating. For example, as shown in FIG. 5, after 20 years of operation one component may reach the 20 year lifetime fatigue limit, whereas other components still have some lifetime in reserve. In this case, replacing the component or components that are incurring a greater rate of fatigue damage allows AEP to be increased. Factored in over the life of the turbine, and taking into account the total cost of the replacement, this may still increase the profitability of the turbine when calculating the NPV.

As an alternative to specifying a schedule of maximum power level values, it is also possible to specify a schedule of fatigue damage, or fatigue life remaining, since rate of fatigue damage incurred is related to the maximum power level setting of the turbine. The turbine power output is then controlled to maintain the fatigue life remaining to that specified by the schedule, for example by using LUEs to track fatigue life in the turbine controller. As a further alternative, an energy schedule could also be used, since this would still be indicative of how the turbine maximum power level varies over time. The energy schedule could be per annum or per calendar month or similar.

For the avoidance of doubt, the schedules may also have non-linear shapes, such as following the shape of a polynomial curve.

Whilst the schedules are shown as varying continuously over their duration, they may vary in a stepped fashion, specifying a given maximum power level over a particular period of time such as a month, season or year. The schedule may, for example, be a series of annual values over the lifetime of the turbine.

Schedules may be calculated once, or the calculation may be repeated at intervals. For example, the schedules may be calculated monthly or yearly. For a schedule that specifies a maximum power level on a yearly basis it may be advantageous to calculate the schedule every month or week (for example), because changes to the schedule may alert the user to parameters that are changing more quickly than expected.

If a schedule is calculated once, this calculation may take place before the wind power plant is commissioned, or it may take place at any time post-commissioning. For a calculation that is repeated at intervals, the first calculation may take place before the wind power plant is commissioned, or may take place at any time post-commissioning.

First Example

According to a first example, a control schedule is produced that can be used to control a wind turbine. A relative schedule may be defined, and one or more of a minimum wind turbine life or a maximum number of major component replacements may be defined. The schedule is then adjusted to ensure that the fatigue lifetime of the turbine meets the target lifetime whilst maximising AEP.

A wind turbine is operated according to one of the over-rating control techniques described herein using an over-rating controller, which may be implemented by the wind turbine controller.

Lifetime Usage Estimators (LUEs) may be used to determine and monitor the lifetime usage of components. Lifetime Usage Estimators may be used in ensuring the fatigue load limits of all turbine components remain within their design lifetimes. The loads a given component experiences (be they bending moments, temperatures, forces or motions for example) may be measured and the amount of component fatigue life consumed calculated, for example using a technique such as a rainflow count and Miner's rule or a chemical decay equation. Based on Lifetime Usage Estimators, individual turbines can then be operated in such a way as to not exceed their design limits. A device, module, software component or logical component for the measuring of the fatigue life consumed for a given turbine component may also be referred to as its Lifetime Usage Estimator, and the same acronym (LUE) will be used to refer to the algorithm for determining a lifetime usage estimate and the corresponding device, module or software or logic component. LUEs are described in more detail below.

According to the default mode of operation, the over-rating controller will control the amount of over-rating applied based on a function or schedule over the expected or certified lifetime of the wind turbine. Typically this is 20 or 25 years.

The controller is configured to receive input parameters, for example from a site operator, the input defining a new target lifetime for the wind turbine or for one or more specific turbine components. The lifetime usage to date of the turbine, or the relevant turbine components, is determined using the LUEs. This puts a constraint on the amount of component lifetime remaining for the wind turbine, and therefore on the control schedule. In addition, the revised target lifetime puts a constraint on the amount of time over which the remaining component life must extend.

The future available fatigue lifetime may be calculated offline or online using site check software, and this is used to specify the revised control schedule. The site check function may include a calculation, or one or more simulations, to determine the expected rate of fatigue damage using site based historical data, including measured site climatic data prior to construction, and/or measured site climatic data post-construction, and/or data from LUEs. Site climatic data typically includes data from a met mast or ground-based LIDAR, and may include wind speed, turbulence intensity, wind-direction, air density, vertical wind shear and temperature. Site check calculations may be performed remotely, or by the turbine/power plant level controllers as appropriate.

The site check software may be populated with information or parameters relating to the given WPP site topography, terrain, wind conditions, and so on. The topography and terrain information may be provided by site surveys and/or from knowledge of the WPP site, which may include details of slopes, cliffs, inflow angles to each turbine in the WPP, and so on. Wind conditions, e.g. wind-speeds (seasonal, annual, etc.), turbulence intensity (seasonal, annual, etc.), air density (seasonal, annual, etc.), temperature (seasonal, annual, etc.), and so on, may be provided from Met Mast data and/or from wind conditions experienced and logged by the wind turbines and/or WPPC in location at the WPP.

The site check tool may comprise one or more memory, database, or other data structure, to store and maintain the fatigue load values for each type of wind turbine, wind turbine type maximum power levels for each type of wind turbine, and information and/or parameters relating to the WPP site conditions.

A revised control schedule is therefore generated, whereby the additional power produced by over-rating is adjusted such that the turbine is exposed to a higher or lower rate of accumulation of fatigue damage, depending on whether the new target date for end-of-life is earlier or later than the previous target date, which may be the certified lifetime.

The ability to revise the turbine control schedule allows the operator to change their priorities over time. For example, a major generator on the local grid might be taken out of operation for a mid-life overhaul, or may be retired completely, and the grid may need additional support. This may be reflected in substantially higher long-term tariffs, and so it would be advantageous for the operator to increase energy production in the short term. The operator can therefore decide to reduce turbine life, or the life of affected components such as the gearbox and generator, and generate additional power by over-rating, while accepting shorter wind turbine or turbine component life.

It is possible to determine the lifetime usage of the wind turbine, or of turbine components, using methods other than LUEs. Instead, the operation to date of the turbine can be examined and the fatigue damage that has occurred so far can be calculated. This may be particularly useful when over-rating control is retrofitted to a wind turbine, and the future available fatigue lifetime is again calculated offline using site check software, and this is used to specify the maximum power levels. The site check function may again include an offline or online calculation, or one or more simulations, to determine the expected rate of fatigue damage using site based historical data or measured site data to the point of installation, although in this case the calculation is made without LUE data available.

Operation of a wind turbine up to the date of fitting of the over-rating controller that employs the functionality described herein may be examined using site check software to calculate fatigue loads on turbine components based upon input parameters specifying site topography, site terrain, site meteorological conditions etc. using measured values relating to the wind turbine's precise location within the wind power plant site, such as one or more of energy output, wind speed, wind direction, turbulence intensity, wind shear, air density, turbine mechanical load measurements (for example from blade load sensors), turbine electrical component temperatures and loads, icing events, component temperatures and condition monitoring system outputs. These values may be used to calculate an estimate for fatigue damage that has occurred so far to the turbine components. The future lifetime available for the turbine, or the turbine components, may be calculated by applying the measured values to a site check function wind turbine model or simulation that provides as an output estimated fatigue damage and/or remaining fatigue life based on one or more of these measured values and a value for the wind turbine type maximum power level of the turbine. The simulation or model may provide fatigue damage and/or remaining fatigue life at the component level, or for the turbine as a whole. Fatigue load calculations may be performed according to various calculation procedures. Various examples of such site checking programs will be known to the skilled person and will not be described in detail.

The resulting estimation of the consumed fatigue life of the turbine or turbine components may be used to determine the over-rating strategy applied by the controller. The estimation may be used once, at initialisation of the over-rating control, which may be performed partway through the life of the turbine if being retrofitted. Alternatively, the estimation may be performed periodically during the life of the turbine such that over-rating strategy is periodically updated depending upon how the lifetime fatigue consumption changes throughout turbine life.

Over-rating strategy is determined based upon remaining fatigue life of the wind turbine, or wind turbine components, which is itself based upon the operating lifetime of the wind turbine. The amount of over-rating applied is controlled such that fatigue damage is incurred by the turbine or turbine components at a sufficiently low rate to ensure that the fatigue life of the turbine is only used up at the end, and preferably only just at the end, of the predetermined turbine life.

The determination of component fatigue lifetime estimates may be further extended, or replaced, by using data from one or more condition monitoring systems. Condition monitoring systems (CMS) comprise a number of sensors at strategic points of the drive-train system, in the turbine gearbox, generator or other key components. Condition monitoring systems provide early warnings of component failures, before the component has actually failed. The output from condition monitoring systems may therefore be provided to the controller and used as an indication of the fatigue lifetime consumed by the monitored components, and can particularly provide an indication of when the fatigue lifetimes for the components are reaching their end. This provides an additional way to estimate the lifetime used.

Second Example

A second example is provided for carrying out a more general optimisation process, which may be used to carry out similar sorts of optimisation to that described above, as well as other more general optimisations. The optimisation process of the second example may be carried out by a controller applying an optimisation scheme.

A full financial cost, or levelised cost of energy (LCoE), model of the turbine is included, and used either in off-line calculations prior to installation of an over-rating control system, or used online as part of the wind turbine controller or wind power plant controller. Use of the LCoE model allows optimisation of the over-rating strategy and may also factor in replacement of main components based upon the cost of doing so. As used herein, the term "Levelised Cost of Energy" refers to a measure of the cost of energy from a turbine that is calculated by dividing the lifetime costs of the turbine by the lifetime energy output of the turbine.

Figure 6:
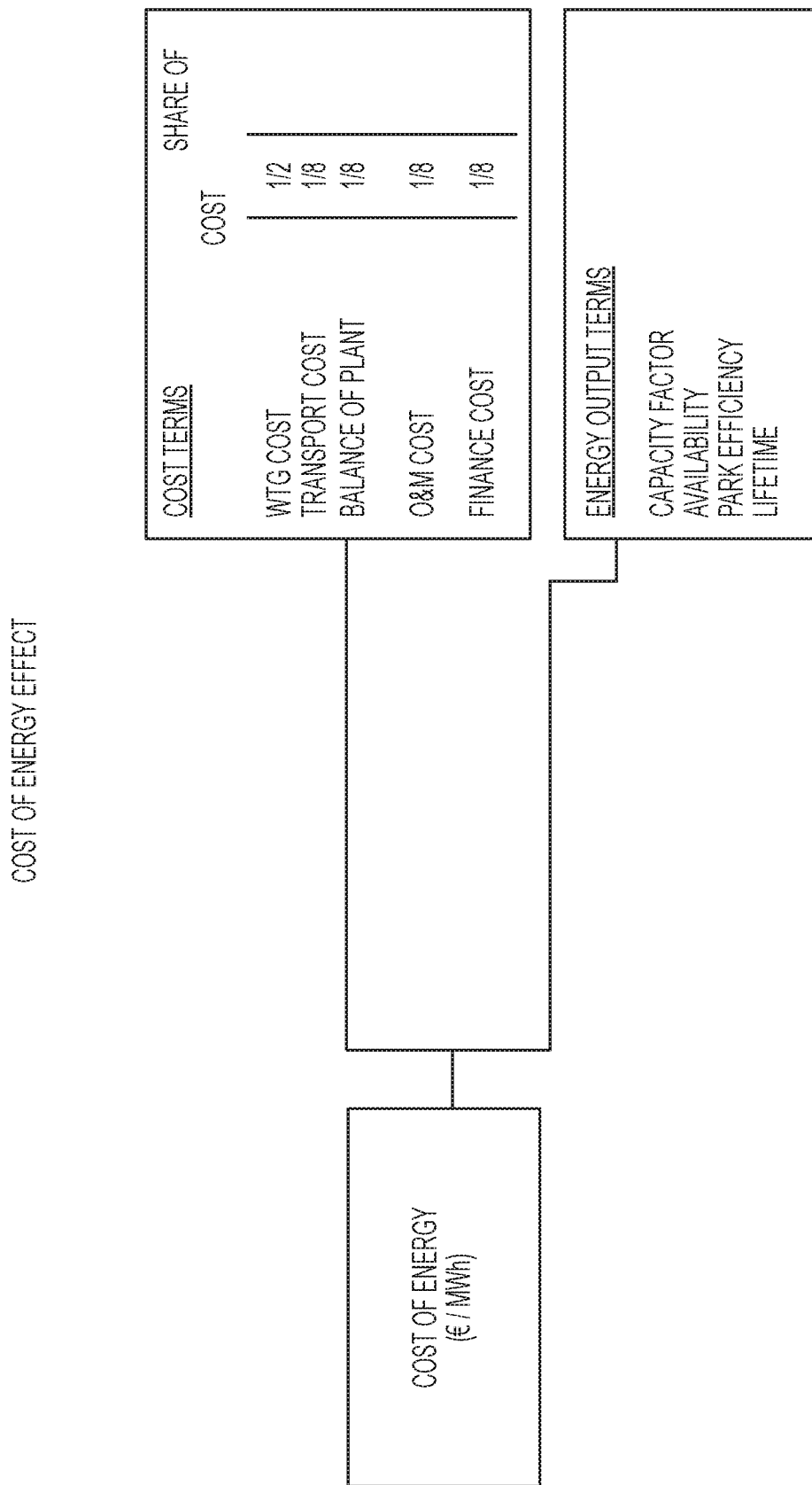
FIG. 6 is an example of a simplified levelised cost of energy model for a wind power plant.

FIG. 6 shows an example of a simplified LCoE model in which the various costs associated with building and operating a wind turbine, and wind turbine power plant, are taken into account.

The wind turbine generator (WTG) cost factors in the total costs for manufacturing the wind turbine. The transport cost factors the cost of transporting the turbine components to the site for installation. The operation and maintenance (O&M) costs factor in the running costs of the turbine, and may be updated as operation and maintenance occurs. This information could be provided by the service technician to the local turbine controllers, to the wind power park controller or elsewhere. The capacity factor indicates the energy generated over a given period, for example one year, divided by the energy that could have been generated if the turbine were to have operated continuously at rated power during that period. The availability indicates the time the turbine will be available to generate electricity. The park efficiency indicates the efficiency of extraction of energy from the wind, and is affected by the spacing of turbines within the park.

Only those elements of LCoE that are affected by the control and component replacement strategy need to be included in the LCoE model, since a number of parameters that may be included in an LCoE model become fixed when the turbine or wind park has been constructed. The affected elements are:

Operations and maintenance (O&M) cost
    Increases if more components are replaced
Capacity factor
    Increases if more aggressive over-rating is used and therefore more MWh are generated
Availability
    Decreases slightly if more major components are replaced, due to downtime required for the replacement procedure
    Decreases slightly if more aggressive over-rating causes increased preventive replacement of, or unscheduled failure of, wear components
Lifetime
    Reduces or increases depending on constraint choice.

Having a financial cost (LCoE) model of the turbine included in the turbine or WPP controller allows for more flexible and efficient control strategies to be determined. For example, if conditions at a particular site are found to be particularly hard on gearboxes then this will be identified and the operator can choose whether to over-rate the turbine and factor in replacing the gearbox a certain number of times. Then the turbine controller can determine when a gearbox should be replaced, run the turbine accordingly, and optionally also provide an indication of when to replace the gearbox.

Figure 7:
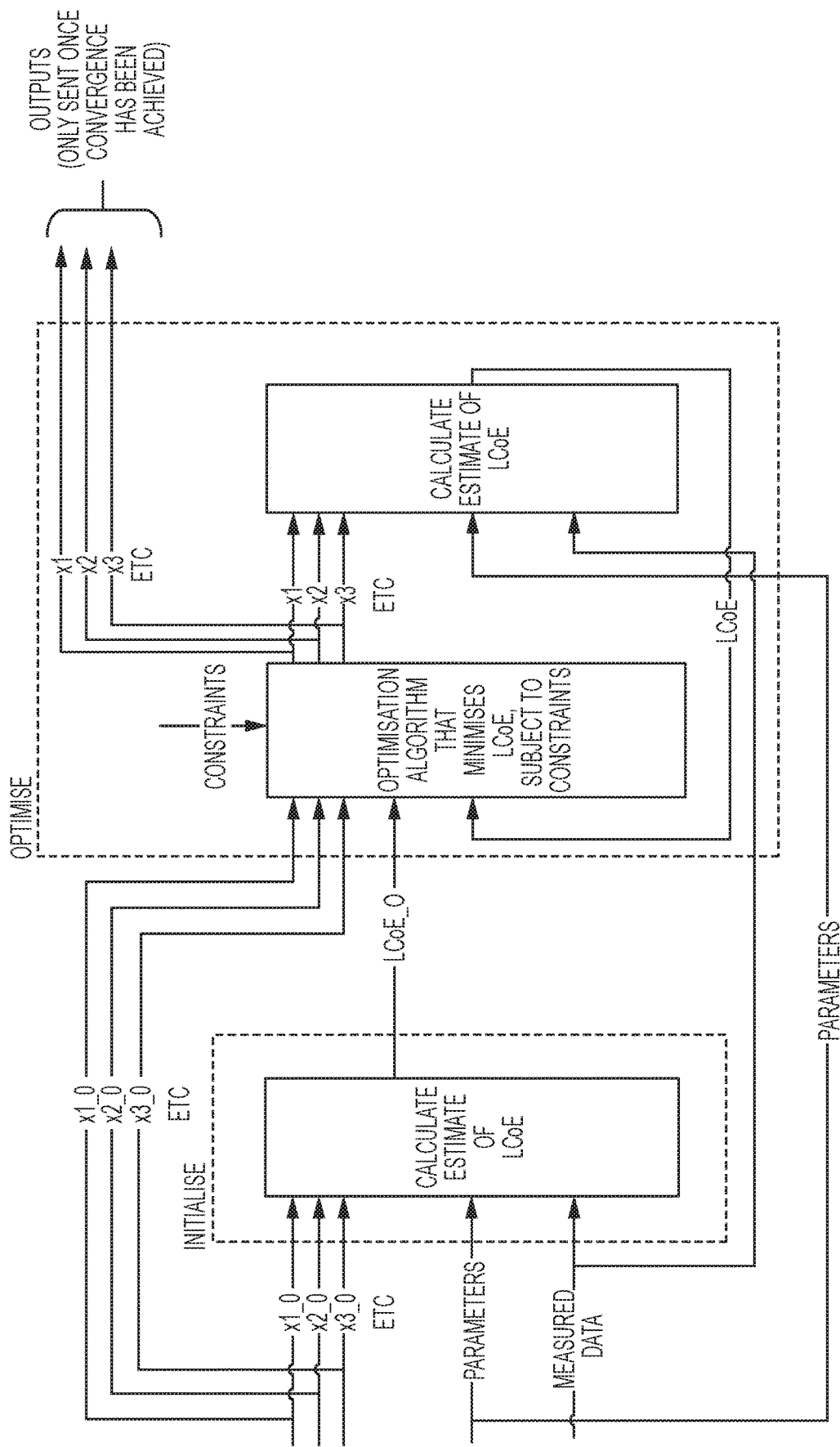
FIG. 7 is a block diagram of an example optimiser for optimising wind turbine control strategy.

FIG. 7 shows a block diagram of an example optimiser for optimising the wind turbine control strategy, and which may be incorporated into a controller, and which may be used to implement various embodiments of the invention.

When the algorithm is started up, the block marked "Initialise" is run once. This provides initial conditions for the optimisation loop. The loop marked "Optimise" is executed periodically, for example once per day, per month or per year. When it is executed, the loop runs as many times as needed to achieve sufficiently good convergence of the optimisation process. Following convergence, the new set of outputs is sent to the wind turbine controller (x1) and to the operator (the other outputs) for implementing the determined control strategy. The two blocks "calculate estimate of LCoE" contain identical calculation methods. They include all the elements of FIG. 6 which are not already fixed, i.e. the O&M cost, capacity factor, availability and lifetime. For example, the tower CAPEX is already fixed, so that does not need to be included. But the operation and maintenance (O&M) cost is not fixed, as the gearbox could be worked harder and replaced once during the lifetime of the turbine, so this is included.

Not all connections in FIG. 7 are shown where there are many similar connections, e.g. between the optimisation algorithm block and the block "Calculate estimate of LCoE". The following terms are used in, or with reference to, FIG. 7:

N number of periods (e.g. years) of lifetime remaining. The user can change this as suits their desired operating strategy, if required.

x1 one dimensional array of individual wind turbine maximum power levels for years 1 . . . N, e.g. for a 3 MW turbine [3.5 MW, 3.49 MW, 3.49 MW, 3.48 MW, 3.47 MW, . . . ]

x2 one dimensional array of number of gearbox replacements for years 1 . . . N, e.g. [0, 0, 0, 0, 0, 0, 0, 0, 1, 0, 0, 0, 0, 0]

x3 one dimensional array of number of generator replacements for years 1 . . . N x4 one dimensional array of number of main bearing replacements for years 1 . . . N x5 one dimensional array of number of replacements of blade sets for years 1 . . . N and optionally:

x6 one dimensional array of number of converter replacements for years 1 . . . N x7 one dimensional array of number of pitch bearing replacements for years 1 . . . N x8 one dimensional array of number of pitch actuator (hydraulics or electrics) replacements for years 1 . . . N x9 one dimensional array of number of yaw drive replacements for years 1 . . . N x10 one dimensional array of number of yaw bearing replacements for years 1 . . . N x11 one dimensional array of number of transformer replacements for years 1 . . . N "_0" indicates an initial condition, e.g. x1_0 is the initial condition of x1

Referring to FIG. 7, the optimisation procedure requires the determination of a number of constants for a given turbine and calculating an initial condition for the optimisation using the values of a number of physical and control parameters. Once the initial condition has been calculated, the optimisation process applies a function defining a relationship between levelised cost of energy and input values for the physical and control parameters to determine the combination of input values that minimises the levelised cost of energy without exceeding certain optimisation constraints.

For the calculation of the initial condition for the optimisation a number of parameter values for a given turbine are ascertained and input into the "Initialise" block. For any given periodic optimisation (e.g. monthly), these values are constant. They are parameters input by the operator, and can be changed at any time but, if changed, will be applied the next time the optimisation is run. These parameters may include one or more of: lifetime of turbine/individual turbine components; gearbox replacement cost; bearing replacement cost; generator replacement cost; blade replacement cost; pitch system replacement cost; and replacement cost of any other components as necessary.

The lifetime of the turbine, and/or the lifetime of one or more components are determined, for example using a site check function and/or one or more LUEs, or may be provided as a constraint to be met. The replaceable components include the blades, pitch bearing, pitch actuation system, hub, main shaft, main bearing, gearbox, generator, converter, yaw drive, yaw bearing or transformer.

The total cost of replacing each of the components is determined. For example, for a replacement gearbox, the cost will take into account whether a new or refurbished gearbox is being fitted, the transport costs, and crane and labour costs. Turbine downtime costs are also included, under the Availability section in FIG. 6.

Other costs may be included such as finance costs, including weighted average cost of capital (WACC) etc, and any other elements needed to calculate the effect of future turbine operation strategy on LCoE.

The lifetime parameters may be set by the operator depending on their operational strategy for the site, or may be determined as part of the optimisation. The other constants are based on best knowledge, so they may be updated occasionally, but such updates would be fairly rare. Specifically the O&M costs can only be estimated in advance, and these estimates are replaced with real data as time passes, thereby giving rise to more accurate estimates of future O&M costs.

The following variables are used by the "Initialise" block, and the optimisation algorithm:

x1 one dimensional array of maximum power levels for years 1 . . . N, e.g. for a 3 MW turbine [3.5 MW, 3.49 MW, 3.49 MW, 3.48 MW, 3.47 MW, . . . ]

x2 one dimensional array of number of gearbox replacements for years 1 . . . N, e.g. [0, 0, 0, 0, 0, 0, 0, 0, 1, 0, 0, 0, 0, 0]

x3 one dimensional array of number of generator replacements for years 1 . . . N x4 one dimensional array of number of main bearing replacements for years 1 . . . N x5 one dimensional array of number of replacements of blade sets for years 1 . . . N and optionally:

x6 one dimensional array of number of converter replacements for years 1 . . . N x7 one dimensional array of number of pitch bearing replacements for years 1 . . . N x8 one dimensional array of number of pitch actuator (hydraulics or electrics) replacements for years 1 . . . N x9 one dimensional array of number of yaw drive replacements for years 1 . . . N x10 one dimensional array of number of yaw bearing replacements for years 1 . . . N x11 one dimensional array of number of transformer replacements for years 1 ... N The initial calculation of an estimate of LCoE uses initial estimates from the operator for the initial conditions, x1_0, x2_0, x3_0, etc.

The signal marked "Measured data" in FIG. 7 consists of data from sensors and data determined from O&M procedures. Measured data from sensors may be from the turbine or wind power plant and may include one or more of:

LUE values for one or more of the turbine components such as the gearbox, generator, main bearing, blades, converter, pitch bearing, pitch actuator (hydraulic or electric), yaw drive, yaw bearing, transformer, etc;

wind-speed and environmental data, or other data obtained from a site check program;

CMS data for one or more of the turbine components.

Measured data from operation and maintenance (O&M) activities consists of O&M costs, which may include an estimate based on costs to date (if any). This is used, together with the future scheduled service pattern, experience from other turbines of the same design at the same or at other wind power plants, and experience for certain components of other turbines of different designs that use the same component, to give an estimate of future O&M cost in the LCoE calculation.

From the initial conditions, the optimisation process uses the inputs and constraints to minimise the levelised cost of energy (LCoE), either by calculating the LCoE directly or by calculating certain LCoE variables. Only the part of the LCoE that varies after construction of the turbine needs to be calculated, i.e. the proportion affected by O&M cost, capacity factor, availability and lifetime. The optimisation is run until the LCoE is minimised, for example until the change in the calculated LCoE from step to step is within a given tolerance.

The constraints on the optimisation are regions in which the optimisation algorithm cannot enter when searching for the minimum value of LCoE. The constraints may include one or more of: wind turbine type maximum power level; minimum power output of the turbine type; maximum active power capacity of the wind power plant's connection to the electricity grid, i.e. maximum sum of all turbines' active power output; and any other appropriate constraints.

The constraints may also include one or more of the following, which may be defined by a user:

minimum or target desired wind turbine life;

a maximum number of component swaps, for all components or for one or more given components;

a predefined maximum power level schedule, or a predefined relative maximum power schedule that defines the shape of the maximum power schedule.

The number of inputs for each one dimensional array may be selected to make the optimisation algorithm's run-time more manageable. The one dimensional arrays x1, x2 etc., are described above as being provided for every year of operation. Whilst it is possible to provide inputs for every month or season of operation, this would provide 12 times, or 4 times, as many inputs. Therefore annual values may be used. Of course, different time periods may be used as appropriate, depending upon the desired computation time, or granularity of the optimisation.

Again, to make run-time more manageable, the wind turbine components may be selected such that only the most relevant components are used in the optimisation. Components to be included may be selected on the basis of whether their lifetime is significantly affected by active power output above rated wind-speed, particularly the gearbox, generator, main bearing and blades.

In addition, or alternatively, the components used in the optimisation may be selected based upon their value. For example, only components which have a value of 5% or more of the turbine total cost may be included.

The optimiser algorithm generates a number of outputs each time it is run to convergence. The one dimensional array x1, representing a schedule of maximum power levels for years 1 ... N for the turbine may be used in closed-loop control by automatically communicating the data to the wind turbine controller to be used as the turbine power demand until the next time that the optimisation loop is run (e.g. 1 month later). Alternatively, the maximum power levels may be used without an automatic control loop, in an advisory capacity, for example by sending the maximum power level data to a computer system for output on a display for viewing by the service department.

The other one dimensional arrays x2, x3, x4, represent a schedule for the replacement of components. This schedule data may be output to another computer system to allow action to be taken. The data may be provided directly into component replacement scheduling software. Alternatively, the component replacement data, including suggested replacement dates, may be used as an advisory output sent to a display for viewing by the service department to decide upon a manual implementation of component replacement plans.

It should be noted that the one dimensional array of maximum power levels (x1) described above may be provided as over-rated levels only, over-rated or de-rated levels, or de-rated levels only, such that the maximum power level variable would only need to specify the amount above (or below) rated power. The power demand could alternatively be a speed demand and/or a torque demand for each period, or a fatigue lifetime consumption where power is controlled by a life use control function as described below. The disadvantage or using both a speed demand and a torque demand is that the computing time for calculating the optimal configuration will be longer.

Although the optimiser is described above as being executed periodically, it may be used sporadically, or even only once. For example, the optimisation may be performed offline, at the point of installing an over-rating controller. Alternatively the optimiser may be embodied in a controller, either at the wind turbine, the wind power plant, or elsewhere, in which case it will be executed at a particular time step.

As mentioned above, the optimisation may be performed with or without LUEs, since site data can be used to determine component fatigue, and thus give an indication of remaining lifetime available for the turbine or turbine components.

Whilst the optimisation algorithm has been described primarily in relation to use with an over-rating controller, this is not a requirement. The optimisation could be applied with any control action that trades off energy capture against turbine fatigue loading. This could include one or more of: changing power demand such as by de-rating; thrust limiting, which limits power output to prevent high thrust loads by reducing rotor thrust at the 'knee' of the power curve at the expense of power output; or any other control feature that trades off energy capture and fatigue loads.

Whilst the calculations required could be carried out in any location, in practice a strategic action like this may be better carried out in the wind power plant controller, such as a SCADA server. This allows the service data to be entered directly on site, avoiding communication problems from site to control centre. However the calculations could also be carried out in the control centre. The same applies to the other methods described herein, including the methods of the first example.

Maximum Power Level Calculation

There now follows a description of example techniques for determining the maximum power levels that may be applied to turbines.

A method for determining a Wind Turbine Type Maximum Power Level for a type of wind turbine may comprise: simulating a load spectrum for two or more test power levels to determine a load on the type of wind turbine for each of the two or more test power levels; comparing the determined load for each test power level with a design load for the type of wind turbine; and setting the wind turbine type maximum power level for the type of wind turbine as the maximum test power level at which the determined load does not exceed the design load for the type of wind turbine.

Accordingly, a Wind Turbine Type Maximum Power Level can be determined for one or more types of wind turbine.

Figure 8:
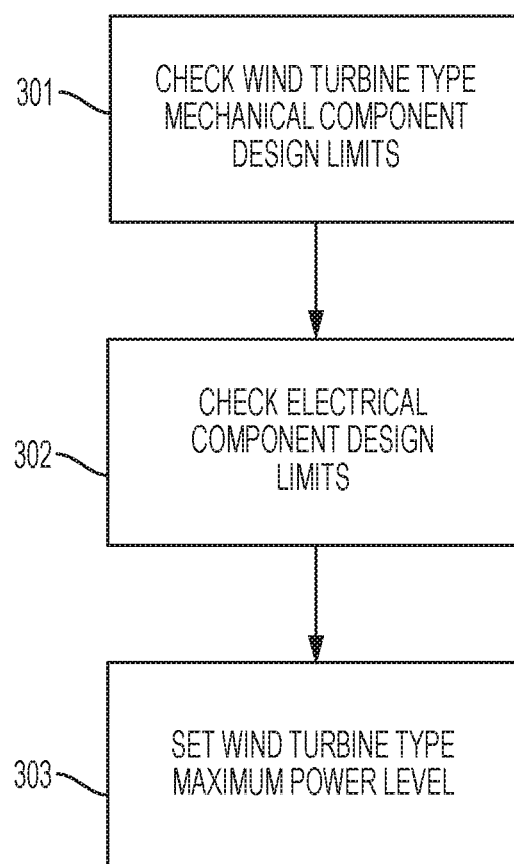
FIG. 8 is an example of a method for determining a wind turbine type maximum power level.

FIG. 8 shows a flow chart detailing an example of setting turbine maximum power levels that may be used with any embodiments. In step 301, a check is performed to determine the wind turbine mechanical component design limits for one or more types of wind turbines. In this example, an offline computer system is utilized to determine the design limits. However, as will be appreciated, the functionality may be implemented by an online computer system, or any other software and/or hardware associated with wind turbines and/or WPP.

The wind turbine type maximum power level is the maximum power level that a given type of wind turbine is allowed to produce when the wind is suitably high if it is to be operated at the limit of the design loads of the components of the wind turbine. The wind turbine type maximum power level effectively applies for the design lifetime of the turbine. Therefore, the wind turbine type maximum power level will typically be higher than the nominal name-plate rating for that type of wind turbine as the nominal name-plate rating is typically a more conservative value.

A type of wind turbine, as used in the following examples and embodiments, may be understood as a wind turbine with the same electrical system, mechanical system, generator, gearbox, turbine blade, turbine blade length, hub height, and so on. Accordingly, any difference to the main structure or components of a wind turbine effectively generates a new type of wind turbine, for the purpose of the embodiments of the present invention. For example, the same wind turbine except for different hub heights (e.g. tower heights) would be two different types of wind turbine. Similarly, the same wind turbine except of different turbine blade lengths would also be considered two different types of wind turbine. Also, a 50 Hz and 60 Hz wind turbine are considered different types of wind turbine, as are cold climate and hot climate designed wind turbines.

The type of wind turbine therefore does not necessarily correspond to the International Electrotechnical Commission (IEC) class of wind turbine as different types of turbine may be in the same IEC class of wind turbine where each type of wind turbine may have a different wind turbine type maximum power level based on the design of and components in the wind turbine.

In the following example, the wind turbine is rated at a nominal plate rating power level of 1.65 MW (1650 KW), with a hub height of 78 metres and designed for service in the conditions of a specific IEC Wind Class.

The wind turbine type mechanical components' design limit may then be determined for this type of wind turbine by simulating a load spectrum for a first test over-rate power level to identify the loads on the type of wind turbine for that first power level. The loads may be mechanical loads, fatigue loads, any other loads that may be experienced by the wind turbine, or any combination of the different loads. In this example, the mechanical loads are considered however, as will be appreciated, other loads, e.g. fatigue loads could also be taken into account. The process of simulating the load spectrum may also include or be an extrapolation or other form of analysis that may be performed to determine the load on the type of wind turbine.

A load spectrum typically includes a range of different test cases which may be run in a computer simulation of a wind turbine. For example, the load spectrum may include test cases for winds at 8 m/s for duration of 10 minutes, for 10 m/s for 10 minutes, for different wind directions, for different wind turbulences, for startup of the wind turbine, for shutdown of the wind turbine, and so on. As will be appreciated, there are many different wind speeds, wind conditions, wind turbine operating conditions, and/or fault conditions for which there are test cases to be run in the wind turbine simulation of the load spectrum. The test cases may include real, actual data or artificial data (e.g. for 50 year gusts that are defined in the standards relating to wind turbines). The simulation of the load spectrum may determine the forces and loads affecting the wind turbine for all test cases in the load spectrum. This simulation may also estimate or determine the number of times that the test case event may occur, for example, a test case of 10 m/s wind for a duration of 10 minutes may be expected to occur 2000 times during the 20 year lifetime of the wind turbine and therefore the fatigue on the wind turbine for the lifetime of the wind turbine can be calculated. The simulation may also calculate or determine the fatigue damage or load that could be incurred by the various components in the wind turbine based on the determined loads affecting the wind turbine.

In this example, the first test power level may be 1700 KW as this is higher than the nominal name-plate rating power level for the type of wind turbine being considered in this example. The load spectrum may then be simulated for the given type of wind turbine in order to determine whether the type of wind turbine can operate at that first test power level without exceeding the ultimate design loads of the mechanical components of the type of wind turbine. If the simulation identifies that the type of wind turbine can operate at the first test power level then the same process may be repeated for a second test power level. For example, the second test power level, in this example, may be 1725 KW. The load spectrum is then simulated for the given type of wind turbine to identify whether that type of wind turbine can operate at that second test power level without exceeding the ultimate design loads of the mechanical components.

If the ultimate design loads of the mechanical components are not exceeded then the process of simulating the load spectrum for further test power levels can be iteratively performed. In this example, the test power levels are incremented at steps of 25 KW however, as will be appreciated, the incremental steps may be any suitable for the purpose of identifying the wind turbine type maximum power level, e.g. 5 KW, 10 KW, 15 KW, 20 KW, 30 KW, 50 KW, and so on, or increase by a percentage of the test power level, e.g. 1% increments, 2% increments, 5% increments, and so on. Alternatively, the process start at a high first test power level and for each iteration decrements the test power level by a suitable amount until the wind turbine type maximum power level is identified, i.e. the first test power level at which the type of wind turbine can operate without exceeding ultimate design limitations.

In this example, the given type of wind turbine is identified as being able to operate at further test power levels of 1750 KW, 1775 KW and 1800 KW before a design limitation of one or more mechanical components is exceeded at 1825 KW. Thus, the process identifies that the wind turbine type maximum power level for this type of turbine is 1800 KW.

In further embodiments, as the type of wind turbine did not exceed the ultimate design loads for the mechanical components at 1800 KW but did exceed the ultimate design loads for the mechanical components at 1825 KW then the process could further iteratively increment the test power levels by smaller increments, e.g. 5 KW to identify whether the wind turbine could operate without exceeding the mechanical ultimate design loads at a power level between 1800 KW and 1825 KW. However, in the current example, the power level of 1800 KW is taken as the wind turbine type mechanical component design limit for this type of wind turbine.

The process of determining the wind turbine type maximum power level may then be performed for any further types of wind turbine that are to be analysed. In step 302 of FIG. 8, the design limitations for the electrical components in the type of wind turbine may be considered or evaluated for the previously determined wind turbine mechanical component design limits.

In step 302, the main electrical components may be considered to ensure that the determined wind turbine type power level for the mechanical component design limits does not exceed the design limitations of the main electrical components of the type of wind turbine being analyzed. The main electrical components may include, for example, the generator, transformer, internal cables, contactors, or any other electrical component in the type of wind turbine.

Based on simulations and/or calculations it is then determined whether the main electrical components can operate at the previously determined wind turbine type maximum power level for the mechanical component design limits. For example, operation at the mechanical components design limit power level may cause a temperature of one or more electrical cables inside the wind turbine to increase and so reduce the electrical current carrying capability of the electrical cables, which is determined by the size of cable conductor and the conditions for thermal dissipation. Therefore, the current carrying capacity would be calculated for the new temperature conditions in order to determine if the electrical cables are able to operate at power levels up to the wind turbine type maximum power level. Similar considerations may be taken into account for other electrical components, e.g. the temperature of the components, capacity of the components and so on, to identify whether the electrical components can operate at power levels up to the mechanical component design limits.

If it is determined or identified that the main electrical components can operate at the previously determined mechanical component design limits then, in step 303 of FIG. 8, for the given type of wind turbine the wind turbine type maximum power level is set or recorded as the maximum power level for the given type of wind turbine in accordance with the mechanical component design limits. If however it is determined or identified that the main electrical components cannot operate at the previously determined mechanical component design limits, then further investigation or action can be taken to arrive at a turbine type maximum power level that accommodates both the mechanical and electrical components.

Once the wind turbine type maximum power level has been determined for each type of wind turbine then this parameter may be utilized as a constraint within the methods described above, to arrive at a schedule of individual maximum power levels, e.g. the maximum over-rating power level, for each wind turbine in a WPP Different individual maximum power levels for each wind turbine in a WPP are advantageous as the conditions in a WPP may vary across the site of the WPP. Therefore, it may be the case that a wind turbine in one location in the WPP may face different conditions to another wind turbine of the same type at a different location in the WPP.

Accordingly, the two wind turbines of the same type may require different individual maximum power levels, or the lowest individual maximum power level may be applied to all wind turbines of that type in the WPP depending on the preferred implementation. Individual wind turbine specific individual maximum power levels are determined as part of determining the schedule, as described herein.

Over Rating Control

Embodiments of the invention may be applied to wind turbines, or to wind power plants, that are operated by applying over-rating control to determine the amount of over-rating to apply.

An over-rating control signal is generated by an over-rating controller and is used by a wind turbine controller to over-rate the turbine. The control schedule described above can be used within, or in conjunction with, such an over-rating controller to set an upper limit on the amount of power that can be generated by over-rating. The specific manner in which over-rating control signals are generated is not crucial to embodiments of the present invention, but an example will be given for ease of understanding.

Each wind turbine may include an over-rating controller as part of the wind turbine controller. The over-rating controller calculates an over-rating request signal indicating an amount up to which the turbine is to over-rate the power output above rated output. The controller receives data from the turbine sensors, such as pitch angle, rotor speed, power output etc., and can send commands, such as set points for pitch angle, rotor speed, power output etc. The controller may also receive commands from the grid, for example from the grid operator to boost or reduce active or reactive power output in response to demand or a fault on the grid.

Figure 9:
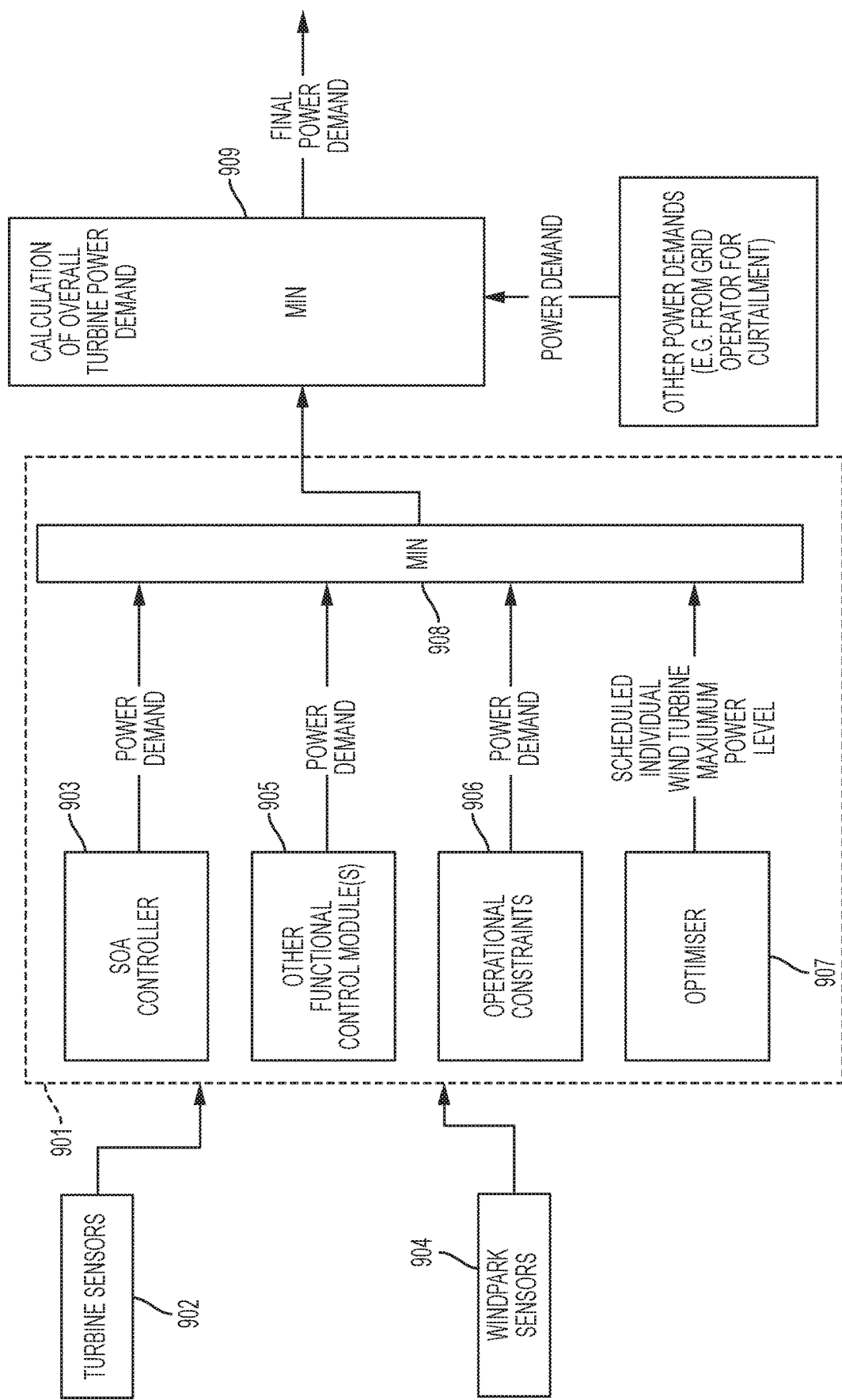
FIG. 9 is a schematic of a wind turbine controller arrangement.

FIG. 9 shows a schematic example of a turbine controller arrangement in which an over-rating controller 901 generates an over-rating control signal that can be used by wind turbine controllers to apply over-rating to the turbine. The over-rating control signal may be generated depending upon the output of one or more sensors 902/904 that detect operating parameters of the turbine and/or local conditions such as wind speed and direction. The over-rating controller 901 comprises one or more functional control modules that may be used in various aspects of over-rating control. Additional functional modules may be provided, the functions of modules may be combined and some modules may be omitted.

The value for individual turbine maximum power level is provided by the optimiser 907 according to the schedule determined as described herein. This provides the maximum power level to which the turbine can be operated to, according to the schedule.

The additional functional modules generate power demands, and will generally serve to reduce the final power demand acted upon by the turbine controller. A specific example of an additional functional module is the operational constraints module 906. Over-rating exploits the gap that typically exists between the component design-loads and the loads experienced by each turbine in operation, which are typically more benign than the IEC-standard simulated conditions in which the design loads were calculated. Over-rating causes the power demand for the turbine to be increased in high winds until either an operating limit specified by an operational constraint (temperature, etc.) is reached, or until an upper power limit is reached that has been set to prevent the exceedance of component design loads. Operational constraints, implemented by operational constraints control module 906, limit the possible over-rating power demand as a function of various operating parameters. For example, where a protection function is in place to initiate a shutdown when the gearbox oil temperature exceeds 65° C., an operational constraint may dictate a linear decrease in the maximum possible over-rating set point signal as a function of gearbox oil temperature for temperatures over 60° C., reaching "no over-rating possible" (i.e., a power set-point signal equal to rated power) at 65° C.

The maximum power level and the power demands from the functional modules are provided to a minimum function, block 908, and the lowest value is selected. A further minimum block 909 may be provided that selects the minimum power demand from the over-rating controller 901 and any other turbine power demands, such as those specified by a grid operator, to produce the final power demand applied by the wind turbine controller.

Figure 1B:
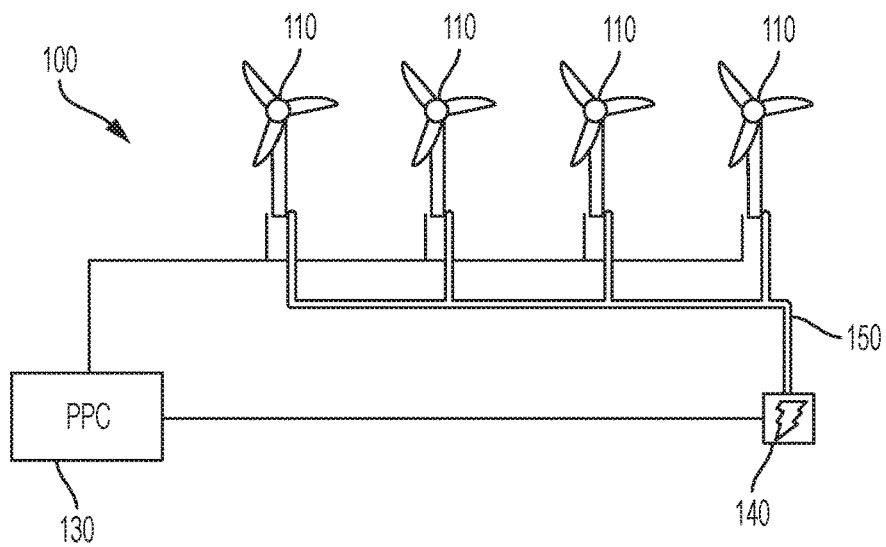
FIG. 1B is a schematic representation of a conventional wind power plant comprising a plurality of wind turbines.
Figure 2:
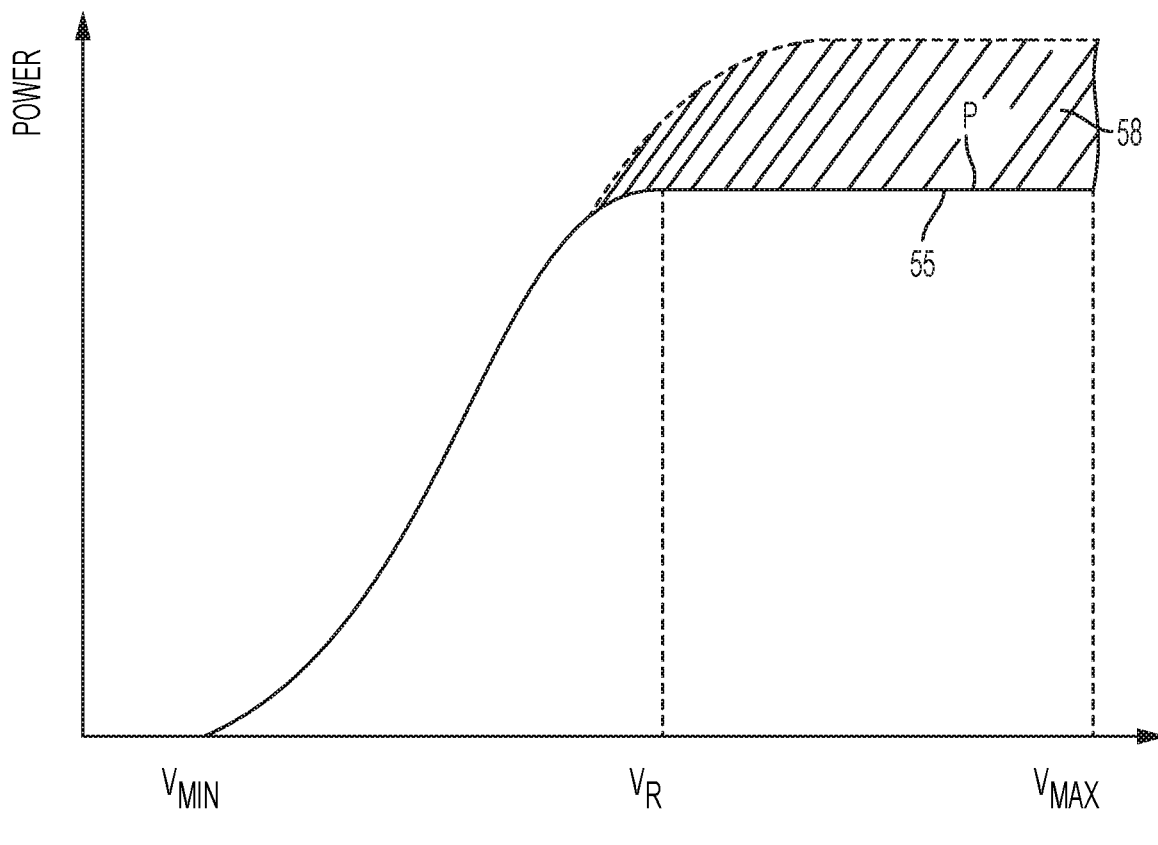
FIG. 2 is a graph illustrating a conventional power curve of a wind turbine.

As an alternative, the over-rating controller may be part of the PPC controller 130 of FIG. 1B for example. The PPC controller communicates with each of the turbines and can receive data from the turbines, such as pitch angle, rotor speed, power output etc and can send commands to individual turbines, such as set points for pitch angle, rotor speed, power output etc. The PPC 130 also receives commands from the grid, for example from the grid operator to boost or reduce active or reactive power output in response to demand or a fault on the grid. Each wind turbine's controller communicates with the PPC 130.

The PPC controller 130 receives power output data from each of the turbines and is therefore aware of the power output by each turbine and by the plant as a whole at the grid connection point 140. If required, the PPC controller 130 can receive an operating set point for the power output of the power plant as a whole and divide this among each of the turbines so that the output does not exceed the operator assigned set point. This power plant set point may be anywhere from 0 up to the rated power output for the plant. The "rated power" output for the plant is the sum of the rated power output of the individual turbines in the plant. The power plant set point may be above the rated power output of the plant, i.e. the whole plant is over-rated.

The PPC may receive an input directly from the grid connection, or it may receive a signal which is a measure of the difference between the total power plant output and the nominal or rated power plant output. This difference can be used to provide the basis for over-rating by individual turbines. In theory, only a single turbine may be over-rated, but it is preferred to over-rate a plurality of the turbines, and most preferred to send the over-rating signal to all the turbines. The over-rating signal sent to each turbine may not be a fixed control, but may instead be an indication of a maximum amount of over-rating that each turbine may perform. Each turbine may have an associated controller, which may be implemented within the turbine controller or centrally such as at the PPC, which will implement one or more of the functions shown in FIG. 9 to determine whether the turbine can respond to the over-rating signal and, if so, by what amount. For example, where the controller within the turbine controller determines that conditions at a given turbine are favourable and above rated wind speed it may respond positively and the given turbine is over-rated. As the controllers implement the over-rating signal, the output of the power plant will rise.

An over-rating signal is therefore generated, either centrally or at each individual turbine, the signal being indicative of the amount of over-rating that may be performed by one or more turbines, or the turbines of the power plant as a whole.

Lifetime Usage Estimators

Embodiments of the invention, as described above, make use of Lifetime Usage Estimators (LUEs). The lifetime usage estimators will now be described in more detail. The algorithm required to estimate lifetime usage will vary from component to component and the LUEs may comprise a library of LUE algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, LUEs are implemented for all major components of the turbine including blades; pitch bearings; pitch actuators or drives; hub; main shaft; main bearing housing; main bearings; gearbox bearings; gear teeth; generator; generator bearings; converter; generator terminal-box cable; yaw drives; yaw bearing; tower; offshore support structure if present; foundation; and transformer windings. Alternatively a selection of one or more of these LUEs may be made.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;
Main shaft system—main shaft torque;
Tower—tower stress;
Foundation—foundation stress.

In the yaw system the rainflow algorithm is applied to the tower top torsion to identify the load duration and this output is sent to the stress cycle damage algorithm. In the converter, generator power and RPM is used to infer the temperature and rainflow counting is used on this temperature to identify the temperature cycle and mean values.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy.

The algorithms used for the various types of fatigue estimation are known and may be found in the following standards and texts:

Load Revolution Distribution and Load Duration:
Guidelines for the Certification of Wind Turbines, Germainischer Lloyd, Section 7.4.3.2 Fatigue Loads
Rainflow:
IEC 61400-1 'Wind turbines—Part 1: Design requirements, Annex G
Miners Summation:
IEC 61400-1 'Wind turbines—Part 1: Design requirements, Annex G
Power Law (Chemical decay):
IEC 60076-12 'Power Transformers—Part 12: Loading guide for dry-type power transformers', Section 5.
Power Plant Level Control Any of the methods described herein may be performed at the wind power plant level, whereby a power plant control schedule is generated that comprises individual control schedules for each wind turbine. This has the benefit of allowing the interactions between turbines in a given power plant to be taken into account.

Changes to the power demand/power level of an upstream turbine or turbines affects the power output and rate of accumulation of fatigue damage of any turbines in the wake of the upstream turbine or turbines. The site check software includes information on the positioning of turbines within a wind power plant, and takes into account the relative positions of turbines relative to each other within the wind farm. Wake effects from upstream turbines are therefore factored into calculations by site check software.

In the case of some wind power plants, the power-carrying capacity of the connection from the power plant to the utility grid is less than the sum of the power that is generated by each turbine in the case when all turbines are generating power at the Wind Turbine Type Maximum Power Level. In such cases, the control schedules of the wind turbines, or of the wind power plant, are further constrained so that, for any given time period within the schedule, when the power of all of the turbines is added together it does not exceed the amount of power that can be carried in the connection from the power plant to the grid.

Embodiments described herein rely on analysis of turbine properties and turbine site properties, in the determination of a control schedule for a turbine. The various calculations, including those performed by site check software, may be implemented offline, at one or more different computing systems, and the resulting control schedule is provided to the wind turbine or power plant controller. Alternatively, the calculations may be performed online at the wind turbine controller or power plant controller.

The above described embodiments are not exclusive and one or more of the features can be combined or cooperate in order to achieve the improved overrating control via setting maximum power levels for each wind turbine in a Wind Power Plant that takes into account the environmental and site conditions facing or affecting the wind turbine.

It should be noted that embodiments of the invention may be applied to both constant-speed and variable-speed turbines. The turbine may employ active pitch control, whereby power limitation above rated wind speed is achieved by feathering, which involves rotating all or part of each blade to reduce the angle of attack. Alternatively, the turbine may employ active stall control, which achieves power limitation above rated wind speed by pitching the blades into stall, in the opposite direction of that used in active pitch control.

While embodiments of the invention have been shown and described, it will be understood that such embodiments are described by way of example only. Numerous variations, changes and substitutions will occur to those skilled in the art without departing from the scope of the present invention as defined by the appended claims.

The invention claimed is:

1. A method of generating a control schedule for a wind turbine, the control schedule indicating how the turbine maximum power level varies over time, the method comprising:
    determining a value indicative of the current remaining fatigue lifetime of the turbine, or one or more turbine components, based on measured wind turbine site or operating data;
    applying an optimisation function that varies an initial control schedule to determine an optimised control schedule by varying the trade off between energy capture and fatigue life consumed by the turbine or the one or more turbine components until an optimised control schedule is determined, the optimisation including:
        estimating future fatigue lifetime consumed by the turbine or turbine component over the duration of the varied control schedule based on the current remaining fatigue lifetime and the varied control schedule; and
        constraining the optimisation of the control schedule according to one or more input constraints, wherein the input constraints include a maximum number of permitted component replacements for one or more turbine components and the optimisation further includes varying an initial value for a wind turbine lifetime to determine a target wind turbine lifetime; and operating the turbine according to the optimised control schedule.

2. The method according to claim 1, further comprising: optimising the control schedule by varying the timing and the number of component replacements up to the maximum number.

3. The method according to claim 1 wherein the one or more turbine components that can be replaced include one or more of: the blades, pitch bearing, pitch actuation system, hub, main shaft, main bearing, gearbox, generator, converter, yaw drive, yaw bearing or transformer.

4. The method according to claim 1 wherein the initial control schedule specifies the relative variation over time of the turbine maximum power level up to which the turbine may operate.

5. The method according to claim 1 wherein the input constraints further comprise the upper maximum power output of the turbine allowed by the turbine design and/or the minimum power output of the turbine.

6. The method according to claim 1 wherein determining a value indicative of the current remaining fatigue lifetime of the turbine or one or more turbine components comprises applying sensor data from one or more turbine sensors to one or more lifetime usage estimation algorithms.

7. The method according to claim 1 wherein determining a value indicative of the current remaining fatigue lifetime of the turbine or one or more turbine components comprises using data from a condition monitoring system.

8. The method according to claim 1 wherein determining a value indicative of the current remaining fatigue lifetime of the turbine or one or more turbine components comprises using data obtained from wind park sensors in combination with a site check program that determines loads acting on turbine components based upon the wind park sensors and parameters relating to the wind park and the wind turbine design.

9. The method according to claim 1 wherein optimisation of the control schedule comprises:
varying the control schedule to minimise the levelised cost of energy (LCoE).

10. The method according to claim 9 wherein an LCoE model is used to determine LCoE, the model including parameters for one or more of:
capacity factor, indicative of the energy generated over a period divided by the energy that could have been generated if the turbine were to have operated continuously at rated power for that period;
availability, indicative of the time the turbine will be available to generate electricity; and
park efficiency, indicative of the energy generated over a period divided by the energy that could have been generated if the turbine were to have operated in wind that was wholly undisturbed by upstream turbines.

11. The method according to claim 10 wherein the model further includes parameters for one or more of:
costs associated with replacing one or more components, including turbine downtime, labour and equipment for component replacement, manufacture or refurbishment costs of the replacement components, and transportation costs of the refurbished or replacement components to the power plant; and
service costs associated with replacement of wear parts.

12. The method according to claim 1 wherein the optimised control schedule is a schedule of maximum power levels up to which the turbine can be operated.

13. The method according to claim 1, wherein the control schedule is indicative of the amount of fatigue damage that should be incurred over time, the method further comprising operating the wind turbine, based on one or more LUEs, to incur fatigue damage at the rate indicated by the control schedule.

14. The method according to claim 1 wherein the control schedule specifies maximum power levels above the rated power of the wind turbine.

15. The method according to claim 1 wherein the control schedule indicates how the turbine maximum power level varies over the lifetime of the turbine.

16. The method according to claim 1 further comprising providing the optimised control schedule to a wind turbine controller or wind power plant controller to control the power output of a wind turbine.

17. The method according to claim 1 wherein the method is repeated periodically.

18. The method according to claim 17 wherein the method is repeated daily, monthly or annually.

19. A controller, comprising:
an input/output (I/O) interface;
a memory; and
a processor communicatively coupled to the I/O interface and the memory;
wherein the processor is configured to perform an operation generating a control schedule for a wind turbine, the control schedule indicating how the turbine maximum power level varies over time, the operation, comprising:
determining a value indicative of the current remaining fatigue lifetime of the turbine, or one or more turbine components, based on measured wind turbine site or operating data;
applying an optimisation function that varies an initial control schedule to determine an optimised control schedule by varying the trade off between energy capture and fatigue life consumed by the turbine or the one or more turbine components until an optimised control schedule is determined, the optimisation including:
estimating future fatigue lifetime consumed by the turbine or turbine component over the duration of the varied control schedule based on the current remaining fatigue lifetime and the varied control schedule; and
constraining the optimisation of the control schedule according to one or more input constraints, wherein the input constraints include a maximum number of permitted component replacements for one or more turbine components and the optimisation further includes varying an initial value for a wind turbine lifetime to determine a target wind turbine lifetime; and
operating the turbine according to the optimised control schedule.

20. A computing system for generating a control schedule for a wind turbine, the control schedule indicating how the turbine maximum power level varies over time, the computing system comprising a processor and a memory storing a program, wherein, when executed by the processor, the program performs an operation, the operation comprising:
receiving initial values for a set of variables, being operating variables of the wind turbine and including an initial control schedule, one or more constraints, and data indicative of the current remaining fatigue lifetime of the turbine or one or more turbine components;
optimising the control schedule by minimising or maximising an operation parameter received at the optimisation module that is dependent upon the set of variables by varying one or more of the variables from its initial value in accordance with the remaining fatigue lifetime of the turbine or the one or more turbine components and the one or more constraints; and operating the turbine according to the optimised control schedule;

wherein the constraints include a maximum number of permitted component replacements for one or more turbine components and the optimisation module is further configured to vary an initial value for a wind turbine lifetime to determine a target wind turbine lifetime.

21. The computing system according to claim 20, the operation further comprising receiving the initial values for the set of variables and the sensor data and calculating an initial value for the operation parameter.

22. The computing system according to claim 20 wherein the one or more turbine components are one or more of: the blades, pitch bearing, pitch actuation system, hub, main shaft, main bearing, gearbox, generator, converter, yaw drive, yaw bearing or transformer.

23. The computing system according to claim 20 wherein the operation parameter is the levelised cost of energy (LCoE) for the turbine, and optimising the control scheduled comprises minimising the levelised cost of energy (LCoE).

24. The computing system according to claim 23 wherein a LCoE model is used to determine LCoE, the LCoE model including parameters for one or more of:

capacity factor, indicative of the energy generated over a period divided by the energy that could have been generated if the turbine were to have operated continuously at rated power for that period;

availability, indicative of the time the turbine will be available to generate electricity; and park efficiency, indicative of the energy generated over a period divided by the energy that could have been generated if the turbine were to have operated in wind that was wholly undisturbed by upstream turbines.

25. The computing system according to claim 24 wherein the model further includes parameters for one or more of:

costs associated with replacing one or more components, including turbine downtime, labour and equipment for component replacement, manufacture or refurbishment costs of the replacement components, and transportation costs of the refurbished or replacement components to the power plant; and service costs associated with replacement of wear parts.

26. A controller, comprising:

an input/output (I/O) interface configured to receive:

initial values for a set of variables, being operating variables of a wind turbine and including an initial control schedule;

one or more constraints; and data indicative of the current remaining fatigue lifetime of the turbine or one or more turbine components;

a memory; and an optimizer module configured to be executed by a hardware processor communicatively coupled to the I/O interface and the memory, wherein the optimizer module, when executed by the hardware processor, performs an operation generating a control schedule for the wind turbine, the control schedule indicating how the turbine maximum power level varies over time, the operation, comprising:

optimizing the control schedule by minimising or maximising an operation parameter received at the optimisation module that is dependent upon the set of variables by varying one or more of the variables from its initial value in accordance with the remaining fatigue lifetime of the turbine or the one or more turbine components and the one or more constraints; and outputting the optimised control schedule; and the hardware processor further configured to operate the turbine according to the optimised control schedule;

wherein the constraints include a maximum number of permitted component replacements for one or more turbine components and the optimisation module is further configured to vary an initial value for a wind turbine lifetime to determine a target wind turbine lifetime.

* * * * *